(12) United States Patent  
Kawasaki

(10) Patent No.: US 8,786,697 B2  
(45) Date of Patent: Jul. 22, 2014

(54) APPARATUS FOR DETERMINING THE PRESENCE OF FOG USING IMAGE OBTAINED BY VEHICLE-MOUNTED IMAGING DEVICE

(75) Inventor: Naoki Kawasaki, Kariya (JP)

(73) Assignee: Denso Corporation, Kariya (JP)

( * ) Notice: Subject to any disclaimer, the term of this patent is extended or adjusted under 35 U.S.C. 154(b) by 1315 days.

(21) Appl. No.: 12/008,408

(22) Filed: Jan. 10, 2008

(65) Prior Publication Data

US 2008/0169912 A1   Jul. 17, 2008

(30) Foreign Application Priority Data

Jan. 11, 2007   (JP) ................................ 2007-003928

(51) Int. Cl.
*H04N 7/18* (2006.01)
(52) U.S. Cl.
USPC ......... 348/135; 348/148; 340/425.5; 382/181
(58) Field of Classification Search
USPC ................. 348/135, 148; 340/425.5; 382/181
See application file for complete search history.

(56) References Cited

U.S. PATENT DOCUMENTS

| | | | | |
|---|---|---|---|---|
| 6,037,976 | A * | 3/2000 | Wixson ........................ | 348/122 |
| 7,423,752 | B2 * | 9/2008 | Leleve et al. .................. | 356/338 |
| 7,693,629 | B2 * | 4/2010 | Kawasaki ....................... | 701/36 |
| 7,983,447 | B2 * | 7/2011 | Higuchi et al. ............... | 382/103 |
| 2002/0039438 | A1 * | 4/2002 | Mori et al. .................... | 382/154 |
| 2003/0123706 | A1 * | 7/2003 | Stam et al. .................... | 382/104 |
| 2003/0197867 | A1 * | 10/2003 | Kwon ........................... | 356/437 |
| 2005/0157792 | A1 * | 7/2005 | Baba et al. ............... | 375/240.16 |
| 2008/0042812 | A1 * | 2/2008 | Dunsmoir et al. ............ | 340/435 |
| 2011/0043603 | A1 * | 2/2011 | Schechner et al. .............. | 348/25 |

FOREIGN PATENT DOCUMENTS

| | | |
|---|---|---|
| DE | 29811086 | 10/1998 |
| EP | 0691534 | 1/1996 |
| FR | 2847367 | 5/2004 |
| JP | 08-285498 | 11/1996 |
| JP | 09-051484 | 2/1997 |
| JP | 11-326541 | 11/1999 |
| JP | 2002-268116 | 9/2002 |
| JP | 2006-221467 | 8/2006 |
| JP | 2006-349492 | 12/2006 |
| WO | WO 03/069275 | 8/2003 |
| WO | WO 2007/083307 | 7/2007 |

OTHER PUBLICATIONS

U.S. Appl. No. 11/598,857, filed Nov. 14, 2006, Kawasaki.
Notice of reasons for rejection mailed Mar. 3, 2009 in corresponding JP application No. 2007-003928 with English translation.
Office Action dated Dec. 2, 2008 in JP Application No. 2007-003928 with English translation.
Office Action issued Apr. 10, 2013 in corresponding German Application No. 10 2008 003 947.0 (with English translation).
Hautiere, Nicolas et al., "Automatic Fog Detection and Estimation of Visibility Distance through use of an Onboard Camera" Machine Vision and Applications, vol. 17, Issue 1, pp. 8-20 (Mar. 2006).

* cited by examiner

*Primary Examiner* — Thuong Nguyen
(74) *Attorney, Agent, or Firm* — Harness, Dickey & Pierce, PLC

(57) ABSTRACT

An apparatus that detects the presence of a constituent such as fog affecting a view of space which is present ahead of a vehicle, the constituent resulting from a natural phenomenon in the space is provided. In this apparatus, the determination of whether the presence of the element is determined based on an image that captured by a vehicle-mounted camera and in which a picture of a high-luminance obstacle located on a road over which the vehicle is traveling is masked.

12 Claims, 33 Drawing Sheets

APPARATUS FOR DETERMINING THE PRESENCE OF FOG USING IMAGE OBTAINED BY VEHICLE-MOUNTED IMAGING DEVICE

CROSS REFERENCE TO RELATED APPLICATION

The present application relates to and incorporates by references Japanese Patent Application No. 2007-3928 filed on Jan. 11, 2007.

BACKGROUND OF THE INVENTION

1. The Field of the Invention

The present invention relates to an apparatus and method for determining whether or not fog is present in the environment around a vehicle based on an image which is captured by a vehicle-mounted imaging device such as a camera. For example, the present invention relates to a system and method for determining whether or not an image captured by a vehicle-mounted imaging device is hazed by the presence of fog in an environment around a moving vehicle using an image processing technique in which an high-luminance obstacle is masked.

2. Description of the Related Art

Operators in automotive vehicles in foggy regions encounter hazardous poor visibility conditions. In normal circumstances, an operator in an automotive vehicle gains knowledge of the road alignment through the configuration of markings or the landscape ahead. However, poor visibility conditions often lead to traffic accidents causing human fatalities and property damage. Although the accuracy of weather forecasting has steadily improved, accurately predicting visibility conditions is considered extremely difficult. One of the difficulties lies in that poor visibility frequently occurs in localized areas as a result of microclimate changes in that region, and the condition change in a matter of minutes or seconds. With the aim of reducing the number of the traffic accidents, automotive vehicles are increasingly being mounted with active safety systems. Many of the active safety systems installed in the automotive vehicles include perception sensors such as cameras, laser, radar and the like.

Information obtained by these perception sensors is utilized to perform automatic tasks such as turning on fog lamps or alerting the operator that the safety system installed in his vehicle is inoperative due to lack of sufficient information from the sensors. Hence, in a certain sense, information obtained by a system or a block capable of detecting the presence of fog is a fundamental one for driving assistance. Indeed, in a foggy environment, the operator actually tends to overestimate visibility distance and to drive his vehicle with excessive speed. Therefore, it is important to detect the presence of fog around the vehicle.

The fog effects on the atmospheric visibility are modeled by Koschmieder's law on the apparent luminance of observed objects against background sky on the horizon. In Koschmieder's law, one of the parameters is the extinction coefficient k of fog. In fog, a proportion of the light is scattered by water droplet. Because the absorption of visible light by water droplets can be negligible, the scattering and extinction coefficient are considered to be interchangeable. Koschmieder's law states a simple relationship between the distance d of an object with intrinsic luminance $L_0$ and its apparent luminance L as follows:

$$L = L_0 e^{-kd} + L_\infty (1-e^{-kd}),$$

where $L_\infty$ denotes the luminance of the atmosphere, such as the luminance of the sky, and k denotes the extinction coefficient of the atmosphere. This expression indicates that the luminance of the object observed through fog is attenuated as $e^{-kd}$, and a luminance reinforced by daylight scattered from the atmospheric particles between the object and the observer has a form of $L_\infty(1-e^{-kd})$.

In addition to luminance, contrast can be defined by the following equation:

$$\text{contrast} = \frac{L_0 - L_\infty}{L_\infty},$$

where $L_0$ and $L_\infty$ have the same meaning in the equation of Koschmieder's law. When the object is darker than its background, that is $L_0$ is less than $L_\infty$, contrast C is negative. By the definition of contrast, an attenuation law of atmospheric contrast can be derived as follows:

$$C = C_0 e^{-kd},$$

where C is the apparent contrast at distance d and $C_0$ is the intrinsic contrast of the object against its background.

In practice, the fact that the object is visible is identified when the value of the apparent contrast C is greater than or equal to a threshold value $C_{th}$. In general, the visual range V is defined as the greatest distance at which a black object ($C_0=1$) can be seen in the sky on the horizon with the threshold value $C_{th}=0.05$:

$$V = -\frac{1}{k}\ln(0.05) \cong \frac{3}{k}.$$

The above mentioned theory has been used to determine whether or not fog is present in the outside atmosphere, surrounding the field of view from the operator's seat in a vehicle using an image captured by a vehicle-mounted camera, although Koschmieder's law is derived assuming that atmospheric illumination is uniform.

For example, in WO 03/069275, Lavenant et al. disclose a method for determining whether or not the environment of a vehicle is foggy. The method of Lavenant et al. includes at least four steps for determining the presence of fog: the first step is recording at least one first image of the environment in which a vehicle is traveling, from the vehicle in the direction of travel of the vehicle, the second step is a step of recording a luminance at each point of the first image, the third step is a step of searching a region within the first image that displays minimal line-to-line gradient variation when crossed from bottom to top, in a configuration that allows for compatibility with Koschmieder's law, that is a vertical luminance curve along the vertical axis of the region has at least one point of inflection, and the fourth step is a step of calculating a coefficient of extinction for the fog from the vertical luminance curve. If such vertical luminance curve is found, the presence of fog in the environment of the vehicle is detected. It should be noted that in the method of Lavenant et al., the third step includes steps of estimating the similarity of a pixel to the one located just below through use of a filter that applies some different masks to the first image and computes an average and dispersion of the luminance for the masked images to feature the smallest level of dispersion.

However, in the method of Lavenant et al., there is a need for identifying a region of sky within an image captured by a vehicle-mounted camera because the apparent luminance of an object against its background is needed in order to apply Koschmieder's law.

Further, Schechner et al. disclose in WO 2007/083307 a system and method for estimating and correcting outdoor images captured by a camera and plagued by poor visibility conditions due to atmospheric scattering, particularly haze, implicitly using Koschmieder's law. In order to correct the images caused by poor visibility conditions, subtraction of airlight and correction for atmospheric attenuation by haze should be performed. In the method of Schechner et al., airlight and attenuation parameters are computed by analyzing polarization-filtered images, in particular without identifying sky areas within the images. That is, in conventional methods, these parameters were estimated by measuring pixels in sky areas. Because the method of Schechner et al. uses the fact that the airlight is often partially polarized in haze, the method of Schechner et al. is considered to be applicable for estimating these parameters and for determining the presence of fog, for example, the presence of dilute fog, from captured images by a camera, when the sky is not in view. However, the method of Schechner et al. needs to use at least two images at different polarization states.

Schechner et al. assume that the camera for capturing the images is not moving, but is fixed at some position. Hence, if it is intended that the system of Schechner et al. is installed in a vehicle, a plurality of vehicle-mounted cameras should be needed to capture simultaneously at least two images. This fact lead to a more complex system when the method of Schechner et al. applies to a vehicle-mounted fog detecting system which is not suitable for practical purposes.

Further, the method of Schechner et al. may be less effective when illumination is less directional. The degree of polarization of airtight is decreased by depolarization which caused by multiple scattering, as occurs in fog. Moreover, in general, haze is constituted of aerosol which is composed of molecules having radius of $10^{-2} \sim 10^0$ μm, in contrast to fog that is water droplet having radius of $10^0 \sim 10^1$ μm. Reduction of polarization is also caused by scattering from large particles, even scattering from large haze particles. Therefore, for example in dense fog, an accurate determination of the presence of fog is difficult.

Further, Leleve et al. disclose, in French patent publication No. 2,847,367, a method and system for determining the range of visibility for an operator in a vehicle in the presence of an element disrupting the visibility of the operator and for determining the presence of fog. The method of Leleve et al. includes the following six steps. The first step is a step of capturing at least one image of a field of space located in front of the vehicle, wherein the image is defined by an array of pixels and sweep-lines. The second step is a step of separating the image in two parts by a first vertical line passing through a pre-set point. The third step is a step of determining the luminosity of the pixels of the first vertical line to obtain a curve of luminosity. The fourth step is a step of determining a first tangent to the curve of luminosity tangential at a place of the curve representative of a region of luminosity substantially independent of the disruptive element, such as in the sky. The fifth step is a step of determining a second tangent parallel to the first tangent to the curve of luminosity tangential at a place of the curve representative of stabilization of the luminosity, such as on the road. The sixth step is a step of determining a sweep-line according to the first tangent and the second tangent, wherein the sweep-line is representative of the distance of visibility. In the second step mentioned above, the pre-set point is determined by the following steps: a step of searching zones of the image, each zone responding to the predicate of homogeneity, determining the center of gravity for each of the zones, and determining the global center of gravity of each of centers of gravity for the zones, the global center being the pre-set point. Thus, the global center of gravity is the resultant of centers of gravity for two homogeneous zones on the road and in the sky. The sweep-line is calculated according to an intersection point between the curve of luminosity and a line parallel to the first tangent at a middle point between the first tangent and the second tangent. The range of visibility is determined according to the sweep-line.

That is, the method of Leleve et al. is based on the search for a vertical light gradient. Leleve et al. considered that the disruptive element is fog. As explained above, the method of Leleve et al. is based on the search for a homogeneous region in an image of the road scene and on the search for gradient of vertical light. These searches make it possible to establish a relationship between the range of visibility for the operator in the vehicle and the reversal point (the sweep-line) in the image and to determine whether or not fog is present.

The method of Leleve et al. is applicable to the case where there is an obstacle on the road over which the vehicle is traveling, for example, a bridge and the like. However, their solution presents the following disadvantages. First, in order to perform the method, it is necessary that the image taken by the camera with which a vehicle equipped contains a homogeneous zone in the sky. Second, if there is another vehicle in front of the vehicle and the other vehicle is emitting light from the tail lamp, it is difficult to determine the curve of luminosity.

There has been known another apparatus for executing an image processing on an acquired image from a vehicle-mounted camera for determining the presence of fog, as disclosed by Akutagawa in Japanese Patent No. 3444192. In Japanese Patent No. 344419, the presence of fog is determined based on the degree of image blurring. With fog being present, the image gets blurred according to Koschmieder's law. Thus, the presence of fog is determined upon the estimated degree of image blurring. In estimating the degree of image blurring, first, a differential calculus is executed for each pixel of the entire image to calculate a rate of change of edge intensities in each pixel of the entire image. The edge intensities at each of the pixels in the entire image are used to estimate the degree of image blurring.

With the apparatus disclosed in Japanese Patent No. 3444192, the result of determining the presence of fog is utilized in recognizing a white line on a road. In recognizing the white line on the road on which a vehicle is traveling based on an image captured by the vehicle-mounted camera, if fog is present in an atmosphere on the road, the image gets blurred with a resultant difficulty of recognizing the white line. Therefore, the presence of fog is determined prior to recognizing the white line. It is also disclosed that if the presence of fog is determined, fog lamps are switched on.

The apparatus of Akutagawa installed in a vehicle includes means for capturing an image on the road over which the vehicle is traveling, means for detecting a white line on the road from the image, means for calculating distances from the vehicle to each points of the white line, means for determining degree of blurring at each point of the white line, means for obtaining a curve of degree of blurring at each points of the white line as a function of the distance from the vehicle, means for comparing the curve of degree of blurring at each points of the white line with a given curve that is obtained when visibility of the operator in the vehicle is normal, and means for determining how bad visibility for the operator is.

There is a further known method for identifying poor visibility under adverse weather conditions by processing digital images, as disclosed by Hagiwara in Japanese unexamined patent application No. 2006-221467. In the method of Hagiwara, the weighted intensity of power spectra for an image is calculated as a value for identifying poor visibility. The magnitude of the weighted intensity of power spectra represents the difference in spatial frequencies within the image based on human contrast sensitivity. The weighted intensity of power spectra is calculated using a frequency analyzing technique in which the image is broken down into sinusoidal gratings of different spatial frequencies by Fourier Transform. From the Fourier transform, the power spectrum value corresponds to the amplitude of spatial frequency. Each component of the spatial frequencies of the image shows a corresponding sinusoidal diffraction grating indicating patterns of grayscales in the image. The power spectrum of the spatial frequency indicates amplitudes of each sinusoidal diffraction grating. As visibility in the road decreases in daytime in fog, the number of sinusoidal diffraction gratings of high spatial frequency in the road image decreases and the amplitude of all sinusoidal diffraction grating in the road image becomes small.

The method of Hagiwara includes steps of: an inputting step of inputting a digital image, a Fourier transforming step of performing Fourier transform on the digital image to obtaining the corresponding power spectrum of each component of spatial frequencies within the digital image, a filtering step of filtering predetermined components of spatial frequencies based on human contrast sensitivity function so as to obtain a distribution of intensities of the power spectrum of a filtered digital image, and a determining step of determining of whether or not poor visibility is realized or whether or not fog is present according to the distribution of the intensities of power spectrum. In this method, even if visual angle or resolution of an image capturing block such as a camera or a charge-coupled block (CCD) are changed, it is possible accurately of determine whether or not fog is present. Therefore, there is an advantage in the method in which spatial frequency analyzing technique is utilized over the method for determining whether or not fog is present based on the degree of image blurring that is computed from the rate of change of edge intensities of each pixel of the entire image.

However, if it is intended to determine whether or not fog is present either using the apparatus of Akutagawa in which a degree of image blurring is calculated or using the method of Hagiwara in which spatial frequency analysis technique is utilized, the effects of obstacles contained in a frame of the image capturing block must be eliminated in order to expel noise components from the image to be examined in the edge intensity analysis or the spatial frequency analysis by masking the obstacles within the image. The obstacles generating noise in the edge intensity analysis or the spatial frequency analysis include a lamp standing beside the road, a preceding vehicle in front of the vehicle whose image is not substantially blurred, and a pole beside the road such as an utility pole, and the like. The pictures of these obstacles can be clearly recognized even if in fog, and they need to be masked.

However, if masked portion of the image is increased, it becomes difficult to perform an accurate calculation in the edge intensity analysis or the spatial frequency analysis due to lack of sufficient information in the masked image. In such case, accuracy in determining whether or not fog is present can not be ensured.

SUMMARY OF THE INVENTION

The present invention provides an apparatus and method by which an error in the determination whether or not fog is present is reduced and an accuracy of the determination is improved.

According to one aspect of the present invention, there is provided apparatus that detects the presence of a constituent affecting a view of space which is present ahead of a vehicle, the constituent resulting from a natural phenomenon in the space, includes means for capturing the image of space, means for extracting a reference image, means for estimating the values of luminance, means for masking, means for calculating a total luminance intensity, and means for determining of whether or not the constituent is present. The means for capturing the image of space is adapted to capture the image of space around the vehicle, the image being viewed from the vehicle and consisting of arrays of pixels having luminance values. The means for extracting the reference image is adapted to extract from the image captured by the means for capturing the image, the reference image including a portion of the image of the space located a predetermined distance away from the vehicle. The means for estimating the values of luminance is adapted to estimate the values of luminance of the arrays of the pixels in the reference image. The means for detecting the high-luminance obstacle is adapted to detect the high-luminance obstacle from the reference image, the high-luminance obstacle being higher in luminance than a predetermined luminance value. The means for masking is adapted to mask the area including the picture of the high-luminance obstacle determined by the means for detecting the high-luminance obstacle in the reference image to generate a masked reference image to negate an effect of existence of the obstacle in determining the presence of the element based on the image captured by the means for capturing the image of space. The means for calculating the total luminance intensity is adapted to calculate the total luminance intensity as a function of the values of the luminance of the arrays of the pixels in the masked reference image as the total luminance intensity. The means for determining is adapted to determine of whether or not the constituent is present in the environmental atmosphere around the vehicle in accordance with both the total luminance intensity.

According to another aspect of the present invention, there is provided apparatus that detects the presence of a constituent affecting a view of space which is present ahead of a vehicle, the constituent resulting from a natural phenomenon in the space, includes an image capturing block, a reference image extracting block, a luminance estimating block, a high-luminance obstacle detecting block, a masking block, a total luminance calculating block, and a determining block. The image capturing block captures an image of space ahead of the vehicle, the image being expressed by values of luminance of arrays of pixels. The reference image extracting block that extracts a reference image from the image captured by the image capturing block, the reference image including a portion of the image of the space located a predetermined distance forward of the vehicle. The luminance estimating block estimates the values of luminance of the arrays of the pixels in the reference image. The high-luminance obstacle detecting block detects a high-luminance obstacle which is located in ahead of the vehicle and whose picture is included in the reference image to determine an area including the picture of the high-luminance obstacle in the reference image, the high-luminance obstacle being defined as an obstacle having higher luminance than a predetermined value. The masking block masks the area including the picture of the high-luminance obstacle determined by the high-luminance obstacle detecting block in the reference image to generate a masked reference image to negate an effect of existence of the obstacle in determining the presence of the element based on the image captured by the image capturing block. The total luminance calculating block calculates a total luminance intensity as a function of the values of the luminance of the arrays of the pixels in the masked reference image as a total luminance intensity. The determining block determines the presence of the element in the environmental atmosphere around the vehicle in accordance with both the total luminance intensity calculated by the total luminance calculating block using a fact that the element in the atmosphere scatters light from the sun which results a smaller value of luminance than that obtained in the case where the element is absent in the environmental atmosphere around the vehicle.

According to another aspect of the present invention, there is provided a method for determining the presence of an element interfering with the visibility of a frontal view of an operator in an vehicle in an environmental atmosphere ahead of the vehicle equipped with the apparatus in the daytime, includes steps of: capturing an image of space ahead of the vehicle, the image being expressed by values of luminance of arrays of pixels, extracting a reference image from the image captured by the image capturing block, the reference image including a portion of the image of the space located a predetermined distance forward of the vehicle, estimating the values of luminance of the arrays of the pixels in the reference image, detecting a high-luminance obstacle which is located ahead of the vehicle and whose picture is included in the reference image to determine an area including the picture of the high-luminance object in the reference image, the high-luminance object being defined as an obstacle having higher luminance than a predetermined value, masking the area including the picture of the high-luminance obstacle determined by the high-luminance obstacle detecting block in the reference image to generate a masked reference image to negate an effect of existence of the obstacle in determining the presence of the element based on the image captured by the image capturing block, calculating a total luminance intensity as a function of the values of the luminance of the arrays of the pixels in the masked reference image as a total luminance intensity and determining the presence of the element in the environmental atmosphere around the vehicle in accordance with both the total luminance intensity calculated by the total luminance calculating block using a fact that the element in the atmosphere scatters light from the sun which results a smaller value of luminance than that obtained in the case where the element is absent in the environmental atmosphere around the vehicle.

According to another aspect of the present invention, there is provided a program, for use with a computer system, the program being tangibly embodied in a computer readable medium and being provided for detecting the presence of a constituent affecting a view of space which is present ahead of a vehicle, the constituent resulting from a natural phenomenon in the space, the program enabling the computer to functionally realize the above mentioned method.

DETAILED DESCRIPTION OF THE PREFERRED EMBODIMENTS

Figure 1:
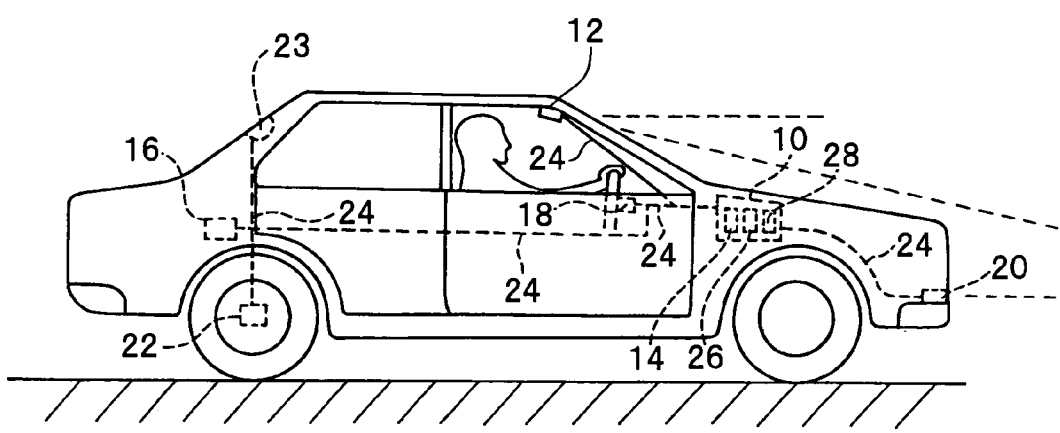
FIG. 1 is a schematic representation of a vehicle equipped with an apparatus according to the present invention.

Preferred embodiments of the present invention will be explained below with reference to attached drawings. Identical parts are denoted by the same reference numerals throughout the drawings.

First Embodiment

Referring to FIGS. 1 to 24, an apparatus according to a first embodiment of the present invention, which determines the presence of an element interfering with the visibility of a frontal view of an operator in an vehicle in an environmental atmosphere ahead of the vehicle equipped with the apparatus in the daytime, will be described below in detail.

FIG. 1 is a schematic representation of a vehicle equipped with the apparatus 10 according to the first embodiment of the present invention.

The apparatus 10 is installed in the vehicle. The presence of an element such as fog leads to poor visibility of a road scene of an operator of the vehicle. Fog is an accumulation of water droplet or ice crystal fines accompanied by water-saturated fine particles that acts to reduce visibility. Thus fog's composition is identical to that of a cloud. In the presence of fog, visible light having a wavelength ranged between 400 and 700 nanometers must be propagated within an aerosol that contains a large number of water droplets. During its trajectory, the visible light is attenuated by absorption and diffusion phenomena. In reality, however, the absorption phenomenon is negligible in the type of aerosol by which fog is composed. Therefore, the predominant phenomenon proves to be diffusion, which acts to make light rays deviation from their initial direction. Such is the origin of fog illumination, or haze luminance, a phenomenon highly characteristic of daytime fog.

The apparatus 10 includes a vehicle-mounted camera 12, an image processing ECU 14, a yaw-rate sensor 16, a steering sensor 18, a millimeter-wave radar 20, a vehicle speed sensor 22, an illuminance sensor 23 which are connected to each other through an in-vehicle LAN 24. Connected to the in-vehicle LAN 24 are a drive support ECU 26 and a light control ECU 28.

Figure 2:
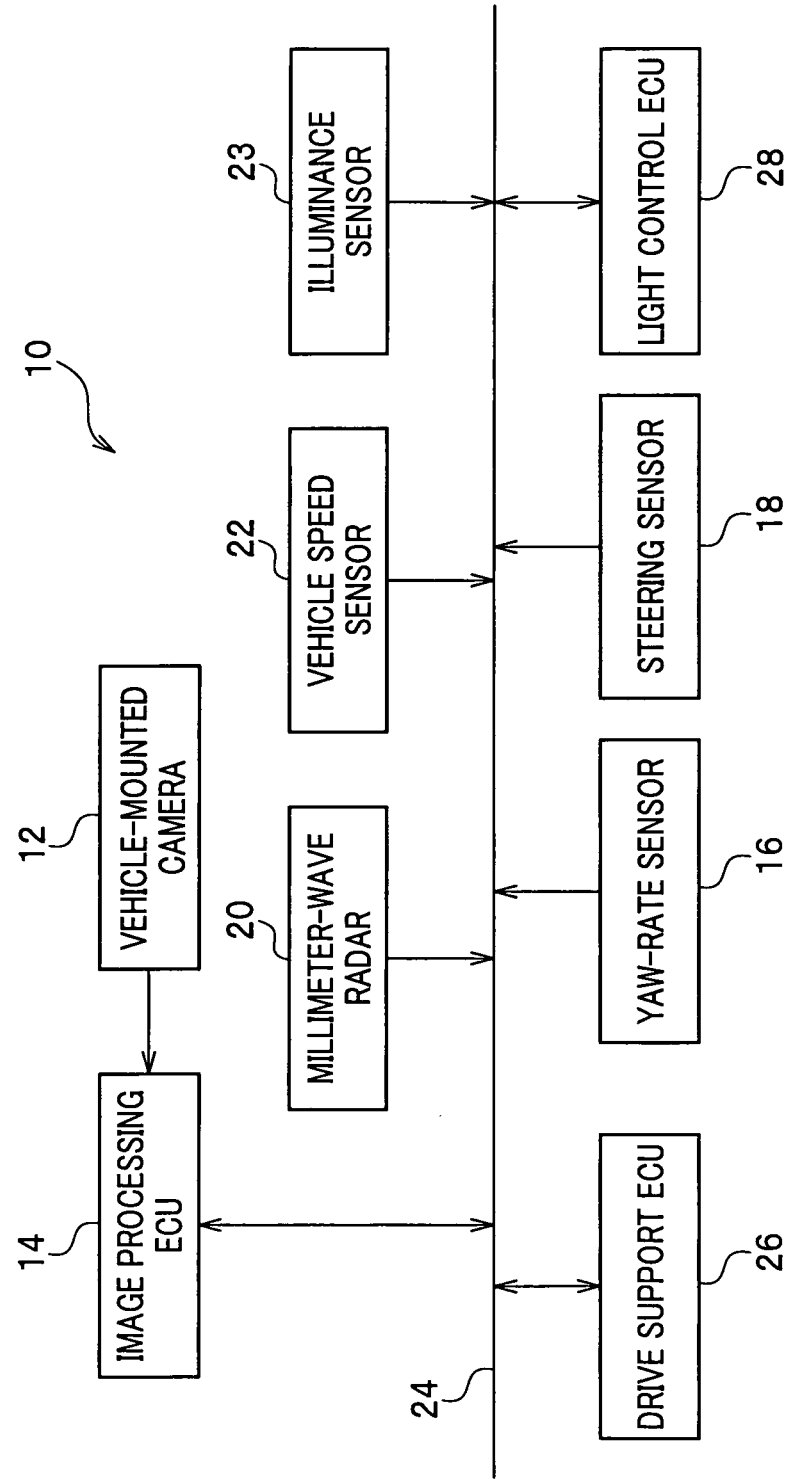
FIG. 2 is a block diagram showing a structure of a vehicle-mounted apparatus that determines the presence of fog according to the present invention.

FIG. 2 is a block diagram showing a structure of the apparatus 10, in which connections between the vehicle-mounted camera 12, the image processing ECU 14, the yaw-rate sensor 16, the steering sensor 18, the millimeter-wave radar 20, the vehicle speed sensor 22, the illuminance sensor 23 and the in-vehicle LAN 24 are emphasized.

The in-vehicle camera 12 is comprised of a CCD camera, which is mounted on an interior such as, for instance, the ceiling at an area close proximity to the operator's seat. The in-vehicle camera 12 picks up an image of a vehicle front to allow pickup image data to be delivered to and processed in the image processing ECU 14.

The image processing ECU 14 is comprised of a computer internally incorporating therein a CPU, a ROM and RAM, etc. The RAM temporarily stores therein data of the images continuously captured by the vehicle-mounted camera 12 for a certain time interval. Then, the CPU executes a basic sequence of operations shown in FIG. 2 to process image data stored in at least one of the ROM and RAM. The operations of the CPU will be described later.

The yaw-rate sensor 16 sequentially detects the yaw rate of the vehicle and a steering sensor 18 sequentially detects the steering angles of a steering wheel. Further, the millimeter-wave radar 20 outputs millimeter-waves toward the vehicle front and receives reflected waves coming from an objective. The drive support ECU 26 functions as vehicle front detecting means. The drive support ECU 26 continuously determines existence or nonexistence of a forward vehicle (a vehicle running in front of the own vehicle in the same traffic lane) based on the reflected waves received with the millimeter-wave radar 20. With the forward vehicle being detected, then, a distance between the forward vehicle and the own vehicle is calculated, a relative azimuth and a relative velocity. In addition, a drive support control such as a vehicle speed control is executed based on calculated information.

The light control ECU 28 executes a control for automatically turning on or turning off fog lamps and headlights (not shown) based on an output illuminance value of an illuminance sensor from the illuminance sensor 21. In addition, with the image processing unit ECU 14 executing the operation to determine that whether or not fog is present, the operation is executed to control the turning-on and turning-off of fog lamps and head lights.

Figure 3:
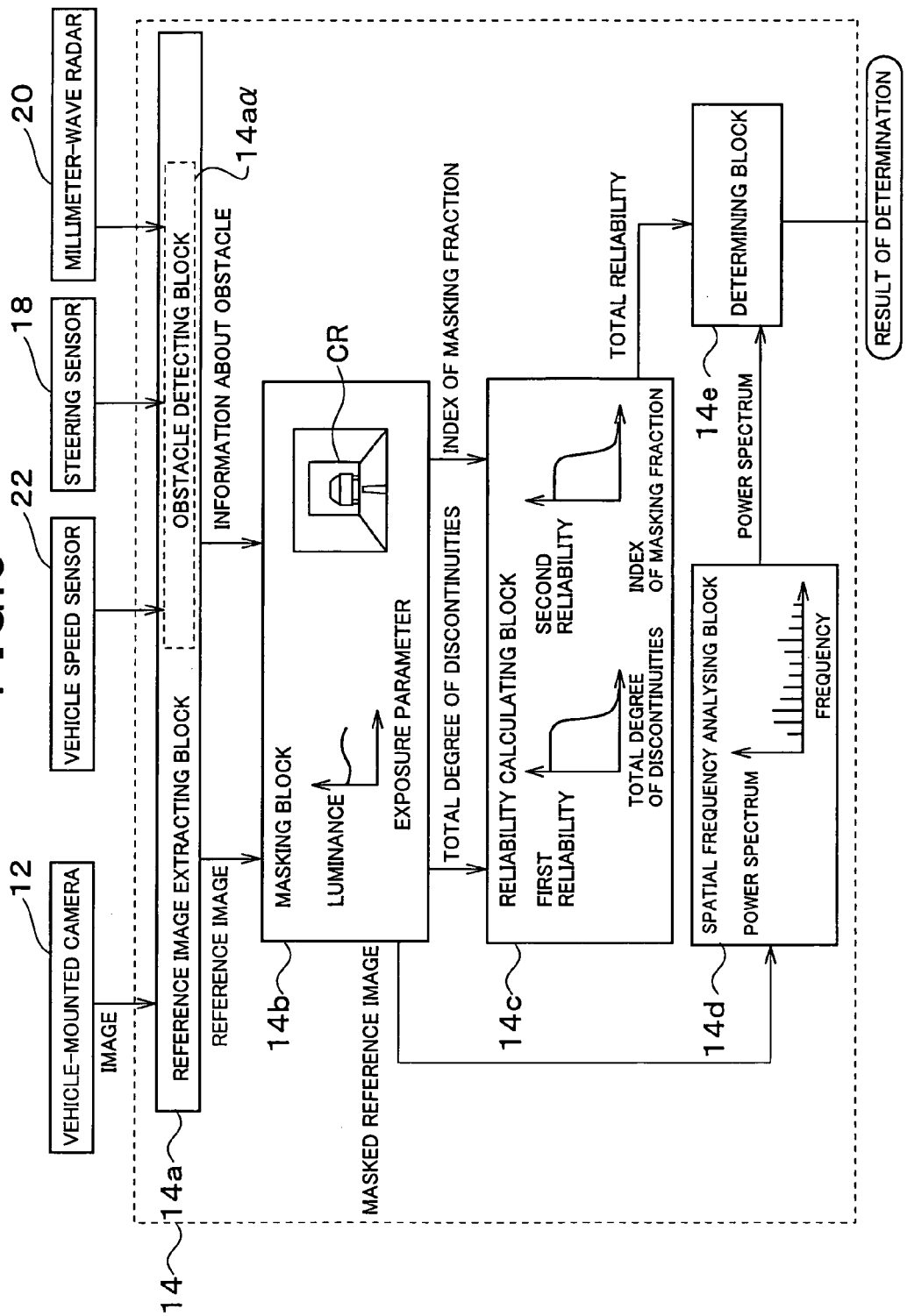
FIG. 3 is a block diagram showing a structure of the image processing unit including a spatial frequency analyzing block according to a first embodiment of the present invention.

FIG. 3 is a further block diagram showing a structure of the image processing unit ECU 14 according to this embodiment. As shown in FIG. 3, outputs of the vehicle-mounted camera 12, the yaw-rate sensor 16, the steering sensor 18, the millimeter-wave radar 20, and the vehicle speed sensor 22 are received by the image processing unit ECU 14.

The image processing unit ECU 14 includes a reference image extracting block 14a, a masking block 14b, a reliability calculating block 14c, a spatial frequency analyzing block 14d, and a determining block 14e.

The reference image extracting block further includes an obstacle detecting block 14aα that connects to the steering sensor 18, the millimeter-wave radar 20, and the vehicle speed sensor 22.

The reference image extracting block 14a extracts a reference image from the image captured by the vehicle-mounted camera 12. The reference image includes a portion of the image of the space located a predetermined distance forward of the vehicle.

The obstacle detecting block 14aα of the reference image extracting block 14a detects an obstacle which is located ahead of the vehicle and whose picture is included in the reference image to obtain a contour of the obstacle in the reference image.

The masking block 14b masks a region including the picture of the obstacle in the reference image in accordance with the contour of the obstacle detected by the obstacle detecting block to produce a masked reference image based on the image captured by the vehicle-mounted camera 12.

The reliability calculating block 14c calculates a reliability of determining the presence of the element based on the region which is masked in producing the masked reference image.

In more detail, the reliability calculating block 14c calculates a first reliability of determining the presence of the element based on a shape of the contour of the obstacle in the reference image which relates to each individual number of unmasked continuous parts of the corresponding array of the pixels, the arrays of the pixels constituting the masked reference image.

Further, the reliability calculating block 14c calculates a second reliability of determining the presence of the element based on an area surrounded by the contour of the obstacle which relates to a fraction of an area of unmasked regions to an area of masked region in the reference image.

The reliability which will be finally outputted from the reliability calculating block 14c is determined based on the first and the second reliability.

The spatial frequency analyzing block 14d transforms luminance data including sequential values of luminance of the pixels in each individual array as a sum of base functions with respective coefficients and calculates a total spatial power spectrum of the image based on the coefficients calculated in the transformation of the luminance data.

The determining block 14e determines the presence of the element in the environmental atmosphere around the vehicle in accordance with both the total spatial power spectrum calculated by the spatial frequency analyzing block 14d and the reliability of determining the presence of the element calculated by the reliability calculating block 14c.

Figure 4:
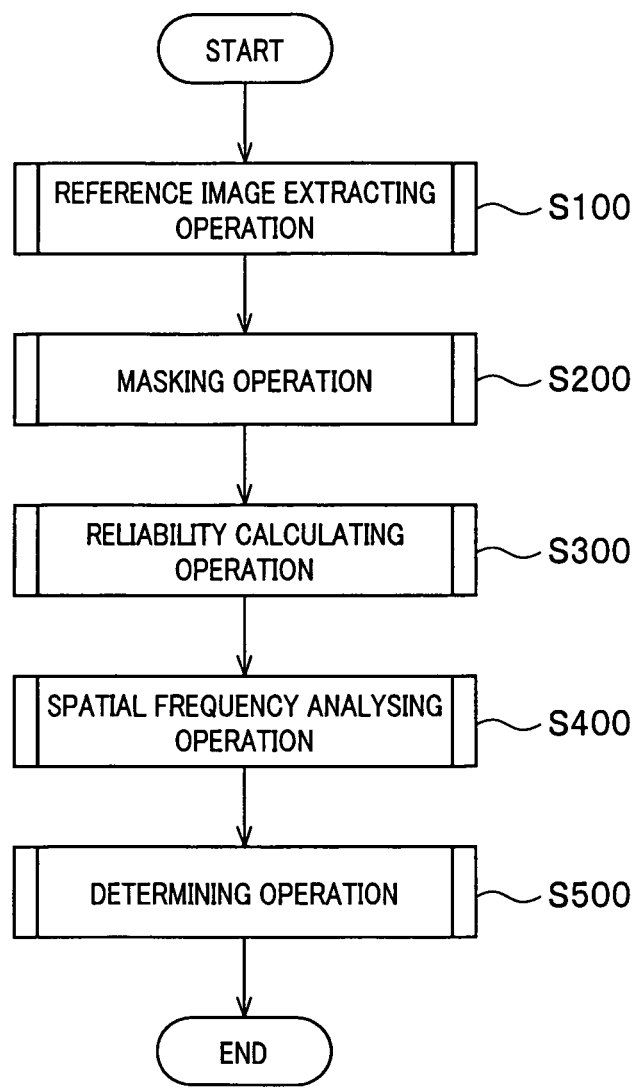
FIG. 4 is a flowchart showing an essence of a control function to be executed by the apparatus according to the first embodiment of the present invention.

FIG. 4 is a flowchart showing the essence of a control function to be executed by the image processing ECU 14. The control, shown in FIG. 4, is executed on a given cycle during the running of a vehicle and, during the execution of the control, the vehicle-mounted camera 12 continuously picks up an image of the vehicle in front of the own vehicle.

As shown in FIG. 4, the image processing ECU 14 performs an extracting operation in which a portion of the entire image captured by the vehicle-mounted camera 12 to be used is extracted in step S100. The portion of the entire image to be used in the determination is referred to as a reference image. This extracting operation is performed by means for extracting the portion of the image to be used in the determination whether or not fog is present from the image captured by the vehicle-mounted camera 12. Next, in step S200, a masking operation is performed by means for masking to reject parts within the reference image that could cause noises during image processing for determining the presence of fog.

Then, in step S300, the reliability of the determination of the presence of fog is calculated based on the masked reference image obtained in step S200. In subsequent step S400, a spatial frequency analysis is carried out on the masked reference image obtained in step S200. In step S500 that is the next step after the step S400, a determination of whether or not fog is present in the environment of the own vehicle is performed based on the result of the spatial frequency analysis carried out in step S400. The steps S100, S200, S300, S400, and S500 will be discussed in detail referring to FIGS. 5, 11, 16, and 22, respectively.

Referring to FIGS. 5 to 10, the reference image extracting operation will be explained in detail.

Figure 5:
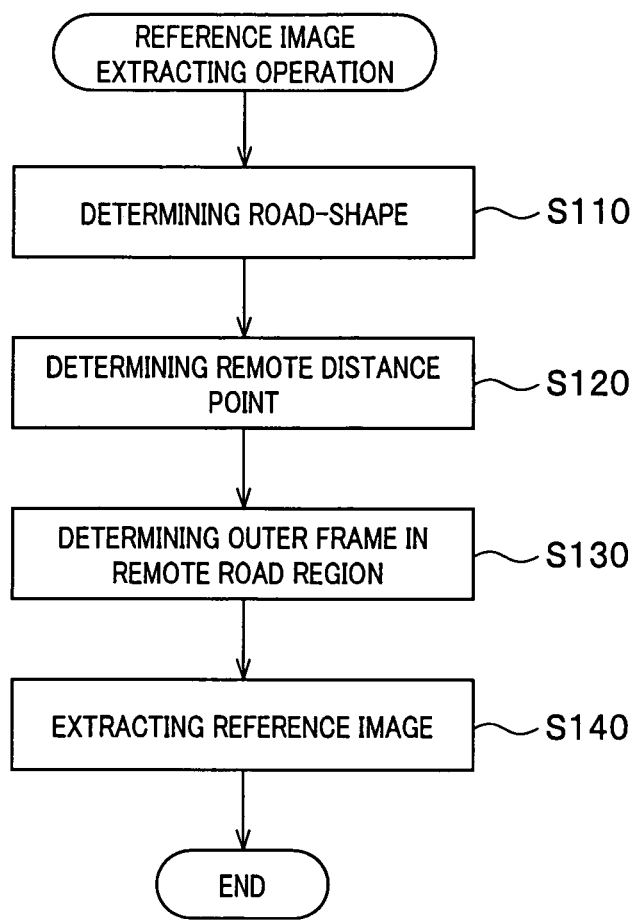
FIG. 5 is a flowchart showing a detail of a reference image extracting operation an extracting operation in which a portion of the image to be used in the determination whether or not fog is present is extracted in step S100 in FIG. 4.

The road-shape determining operation in step S100 is shown in FIG. 5 in detail. First in step S110 in FIG. 5, a white line recognizing operation is executed for recognizing a white line, indicative of a traffic sign provided along a traffic lane, based on a series of images continuously captured by the vehicle-mounted camera 12. The white line recognizing operation may be implemented in various known processing techniques. For instance, the image, captured by the one-vehicle camera 12, is subjected to binary image processing to extract a white line portion from the image resulting from the binary image processing for thereby recognizing the white line. As used herein, the term "white line" refers not only to the white line but also to a yellow line as similarly recognized in a normal white line recognizing operation.

If the white line recognizing operation is successful, the road shape is determined. As used herein, the term "road shape" refers to a single line, representing a twisting pattern on the road extending from the own vehicle to a forward area. The single dot line represents a widthwise centerline of a traffic lane on which the own vehicle is running. However, in place of the single dot line, the road shape may include either one of the white lines placed on both sides of the traffic lane on which the own vehicle is running. In an alternative, with the road having plural traffic lanes, the road shape may include the widthwise centerline of the whole of the road.

The drive support ECU 26 calculates the distance from the forward vehicle and a relevant relative azimuth. Thus, either if the white line recognizing operation is not successful or if a different operation than the white line recognizing operation is applicable, the distance from the forward vehicle and the relevant relative azimuth will be useful to determine the road shape.

In this case, the location of the relevant forward vehicle in the image is determined based on the distance from the calculated forward vehicle and relative azimuth. Next, the operation is executed to determine the steering angle of the steering wheel in response to a signal from the steering sensor 18. Then, the road shape is determined by connecting a given point (such as, for instance, a vehicle widthwise center point of a bonnet at a boundary line thereof on the image) in the image of the own vehicle, which is preliminarily determined as an end point of a line for representing the road shape, and the location of the forward vehicle in the image, to each other using a circular arc with a radius of curvature indicative of the steering angle.

Further, it is possible to determine the road shape based only on the signal from the steering sensor 18. In this case, first, the steering angle is determined based on the signal from the steering sensor 18. In a succeeding step, a circular arc is determined on the line, indicative of the road shape, such that a tangential line is parallel to the vehicle fore and aft direction at the given point in the image on the given point preliminarily determined as the end point of the line representing the road shape for the own vehicle. Also, the yaw rate may be detected in response to a signal from the yaw-rate sensor 16 in place of detecting the steering angle.

Next in step S110, intersecting point between the 100 m line and a line is determined, indicative of the road shape determined in step S120, to be a remote distance point (that is, a point ahead in 100 m) on the road on which the own vehicle is running.

With the road shape determined in such a way in step S110, the remote region determining operation (in step S120 in FIG. 5) is executed to determine a remote distance point on the image in a given remote distance from the own vehicle on the road on which the own vehicle is running. As used herein, the term "given remote distance" refers to a distance 100 m away. However, the present invention is not limited to such a distance of 100 m and may suffice to include a remote distance with a different extent under which the image gets blurred when fog is dense to some extent.

Figure 6:
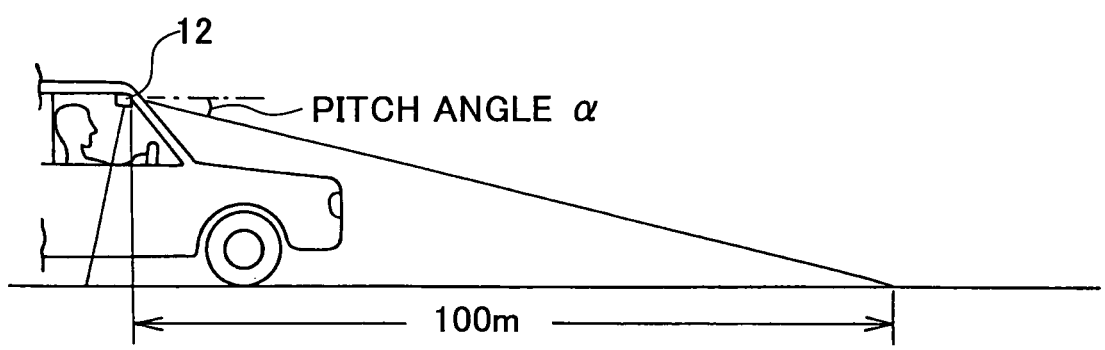
FIG. 6 is a view schematically explaining a space located in front of the vehicle away from the vehicle at a predetermined distance by using the vehicle-mounted camera installed in the apparatus according to the present invention.

The calculation procedure for obtaining the remote distance point is based on a simple geometrical calculation as shown in FIG. 6. The vehicle-mounted camera 12 is positioned at a point a predetermined height, the predetermined height is determined by a size of the vehicle and a pitch angle α of the vehicle-mounted camera 12 from the horizon as shown in FIG. 6.

With the vehicle-mounted camera 12 fixedly secured to the vehicle, it is possible to preliminarily determine a real distance to a surface point on flat ground surface and which on the image the surface point is located. Accordingly, it becomes possible to preliminarily determine a 100 m line on which the surface point 100 m ahead of the own vehicle is located on the flat ground surface on the image. With the present embodiment, the 100 m line Lf represents a remote distance line and stored in at least one of the ROM and RAM inside the image processing ECU 14 or other storage block.

Figure 7:
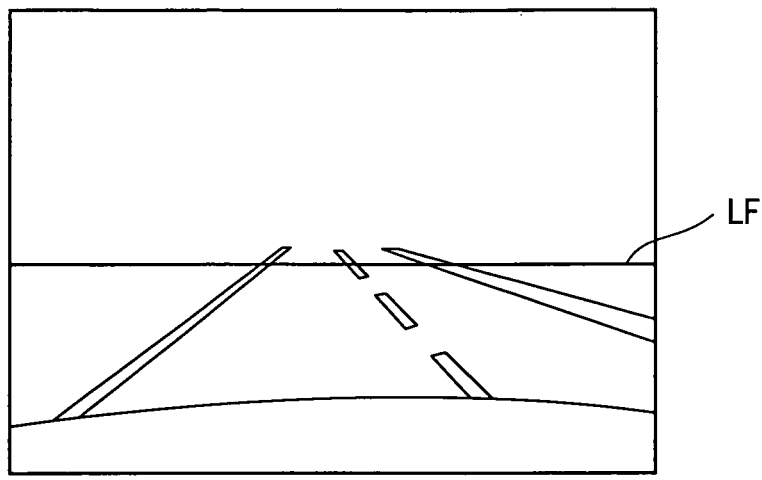
FIG. 7 is an exemplary frontal view or an exemplary image captured by the vehicle-mounted camera according to the present invention in step S120 in FIG. 5, in which the space located the predetermined distance forward of the vehicle has been analyzed as shown by a line LF in the case where the shape of a road over which the vehicle is traveling is straight within a visibility range of an operator in the vehicle as detected in step S110 in FIG. 5.

FIG. 7 is an exemplary frontal view or an exemplary image captured by the vehicle-mounted camera 12, in which the 100 m line Lf has been determined as shown by a line LF.

Figure 8:
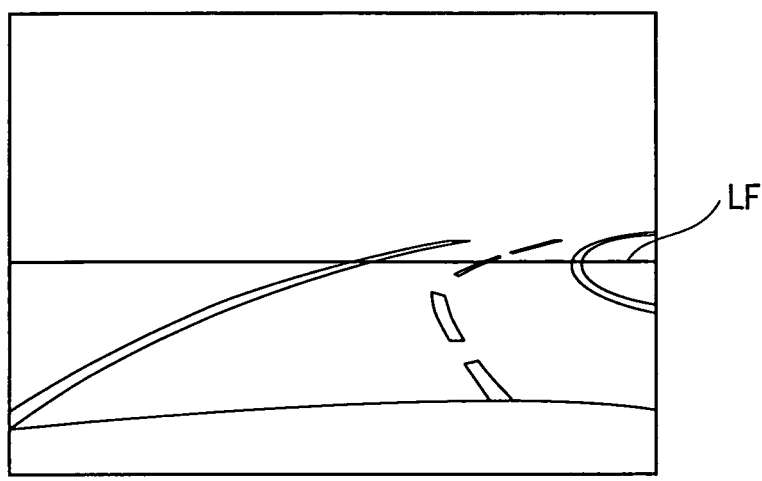
FIG. 8 is another exemplary frontal view or another exemplary image captured by the image capturing block of the apparatus according to the present invention in step S120 in FIG. 5, in which the space located the predetermined distance forward of the vehicle has been determined as shown by a line LF in the case where the shape of a road over which the vehicle is traveling is curved within a visibility range of an operator in the vehicle as detected in step S110 in FIG. 5.

FIG. 8 is another exemplary frontal view or another exemplary image captured by t the vehicle-mounted camera 12, in which the space located the predetermined distance forward of the vehicle has been determined as shown by a line LF in the case where the shape of a road over which the vehicle is traveling is curved within a visibility range of an operator in the vehicle as detected in step S110 in FIG. 5

Figure 9:
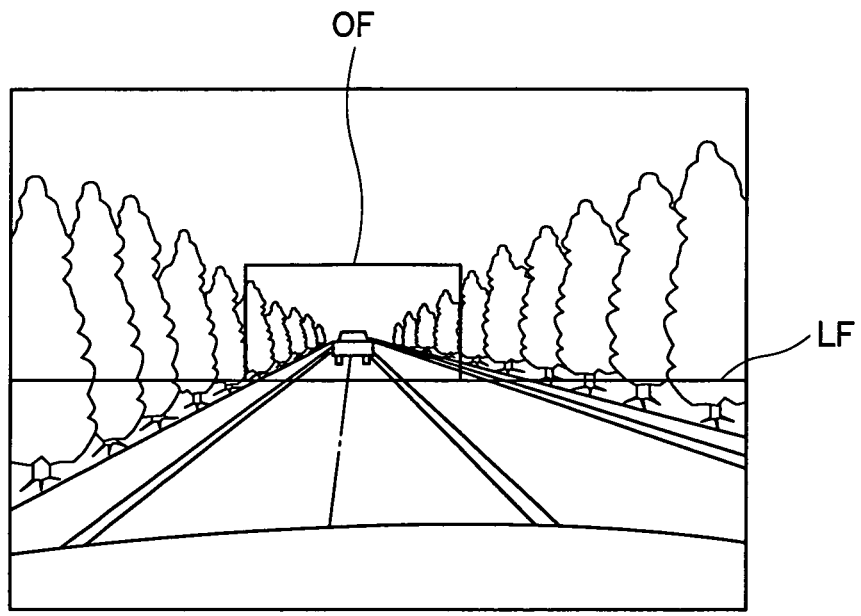
FIG. 9 is an exemplary image showing a result of determination of an outer frame in step S130 in FIG. 5, in which the space located the predetermined distance forward of the vehicle has been determined as shown by a line LF in the case where the shape of the road detected in step S110 in FIG. 5 being travelled is straight as detected in step S110 in FIG. 5.
Figure 10:
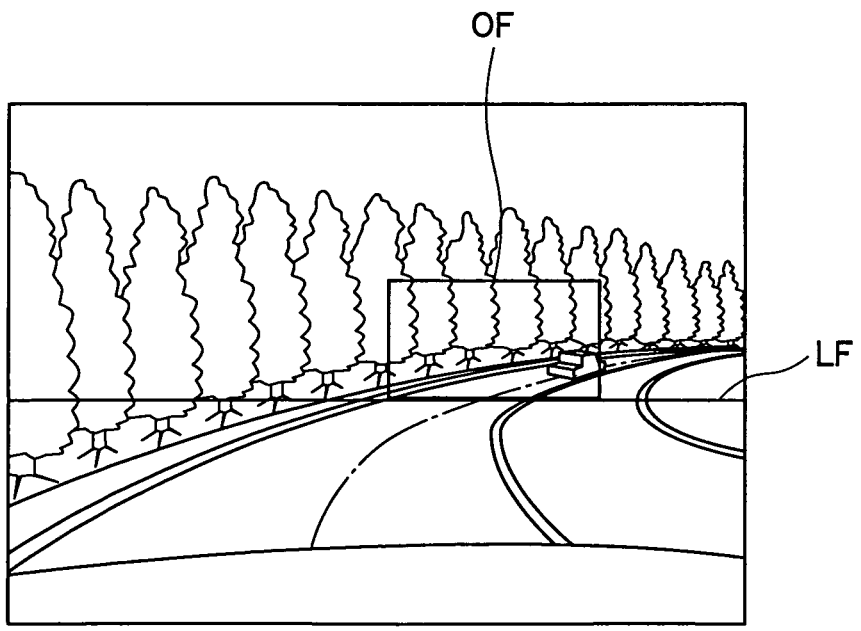
FIG. 10 is another exemplary image showing a result of determination of an outer frame in step S130 in FIG. 5, in which the space located the predetermined distance forward of the vehicle has been analyzed as shown by a line LF in the case where the shape of the road detected in step S110 in FIG. 5 is traveling is curved as detected in step S110 in FIG. 5.

In succeeding step S130, an outer frame OF in the remote road region is determined by reference to the remote distance point determined in step S210. The outer frames OF in the remote road regions, shown in FIGS. 9 and 10, are set such that the remote distance point, determined in step S210, is placed at the center on a lower side of each outer frame OF. In addition, the outer frame OF has a size that is set to an adequately small size with respect to the size of a whole image captured by the vehicle-mounted camera 12.

FIG. 9 is an exemplary image showing a result of determination of an outer frame OF in step S130 in FIG. 5, in which the space located the predetermined distance forward of the vehicle has been determined as shown by a line LF in the case where the shape of the road detected in step S110 in FIG. 5 is traveling is straight as detected in step S110 in FIG. 5.

FIG. 10 is another exemplary image showing a result of determination of an outer frame OF in step S130 in FIG. 5, in which the space located the predetermined distance forward of the vehicle has been determined as shown by a line LF in the case where the shape of the road detected in step S110 in FIG. 5 is traveling is curved as detected in step S110 in FIG. 5.

The present invention is not limited to the examples shown in FIGS. 9 and 10 and the positions of the outer frames OF may be determined such that the remote distance point forms a center of the remote road region. Further, a location of the remote distance point relative to the outer frame OF of the remote road region may be altered depending on: whether the road shape is based on a widthwise centerline of a cruising lane; whether the road shape is based on a widthwise centerline of an entire road; and which of the white lines of the cruising lane is applied to the road shape. For instance, under a circumstance where the road shape (a line indicative thereof) is based on the white line on the right side of the cruising lane, the location of the outer frame OF may be determined such that the outer frame OF, forming the remote road region, has the lower side with a point on ¼ the length thereof from the right side to be set for the remote distance point.

In step S140, a zone inside the outer frame OF within the image is determined as the portion of the image to be used in the determination whether or not fog is extracted.

Referring to FIGS. 11 to 15, the masking operation will be explained in detail.

Figure 11:
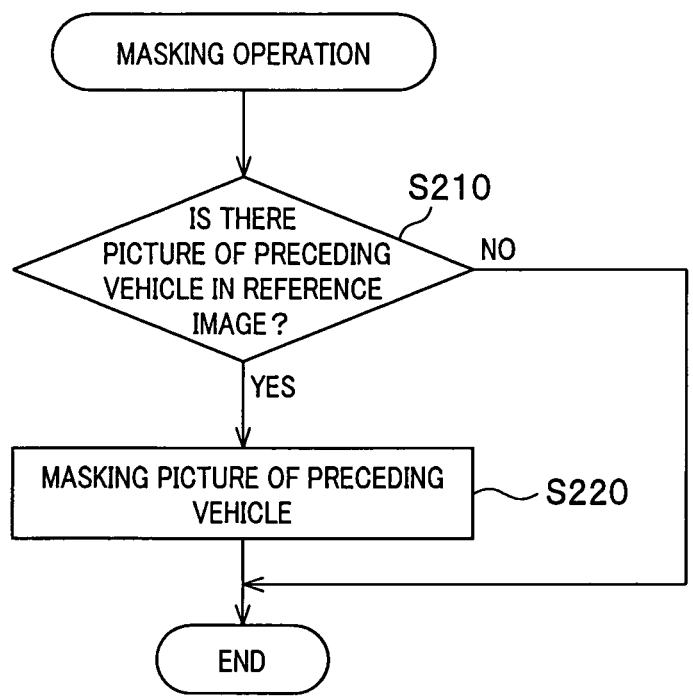
FIG. 11 is a flowchart showing a detail of a masking operation in which a picture within the image having possibility to cause noises in image processing for determining the presence of fog will be removed in this masking operation, the picture including that of a preceding vehicle.

FIG. 11 is a flowchart showing a detail of a masking operation in step S200 in FIG. 2. In the masking operation, a picture within the image having possibility to cause noises in image processing for determining the presence of fog will be removed in this masking operation, the picture including that of a preceding vehicle.

The masking operation is started in step S210 by determining whether or not there exists at least a part of a preceding vehicle within the image obtained in step S100. This procedure must be carried out for the following reason. That is, if the preceding vehicle exists ahead of the vehicle on the road over which the vehicle is traveling, a distance to the preceding vehicle from the vehicle equipped with the vehicle-mounted camera 12 is one of the shortest distances between an obstacle on the road and the vehicle. In many cases, the distance between the preceding vehicle and the vehicle equipped the vehicle-mounted camera 12 is shorter than the given remote distance mentioned in step S110. If it exists, the preceding vehicle is one of the sources of error during the spatial frequency analysis for determining the presence of fog. Hence, the feature of the preceding vehicle should be removed in the reference image, if it exists.

Thus, in step S210, it is judged whether or not the drive support ECU 26 detects the preceding vehicle. If the preceding vehicle exists and is traveling on the road based on the image captured by the vehicle-mounted camera 12, the drive support ECU 26 determines a vehicle zone within the image based on the position within the image and the distance in real space between the preceding vehicle and the vehicle measured by the millimeter-wave radar 20. Then, within the image in which the feature of at least a part of the preceding vehicle is included, a contour and a region CR of the preceding vehicle part of the vehicle zone is specified based on an analysis on luminance of pixels constituting the image captured by the vehicle-mounted camera 12. The region CR within the image captured by the vehicle-mounted camera 12 is compared with the reference image cut out in the extracting operation to determine the existence of a partial or an entire overlap between the region CR and the reference image obtained in step S100 in FIG. 2. In FIGS. 3 and 4 which are exemplary images captured by the vehicle-mounted camera 12, the respective regions CR of the picture of the preceding vehicle determined by the steps discussed above are shown. Both in FIGS. 3 and 4, the region CR of the picture of the preceding vehicle and the reference image are partially overlapped.

If the determination in step S210 is "NO", the masking operation is terminated. In contrast to this case, that is, if the determination in step S210 is "YES", the procedure proceeds to step S220. In step S220, an overlapped region in which the region CR of the picture of the preceding vehicle and the reference image are overlapped within the reference image is removed, and then the masking operation is terminated.

Figure 12:
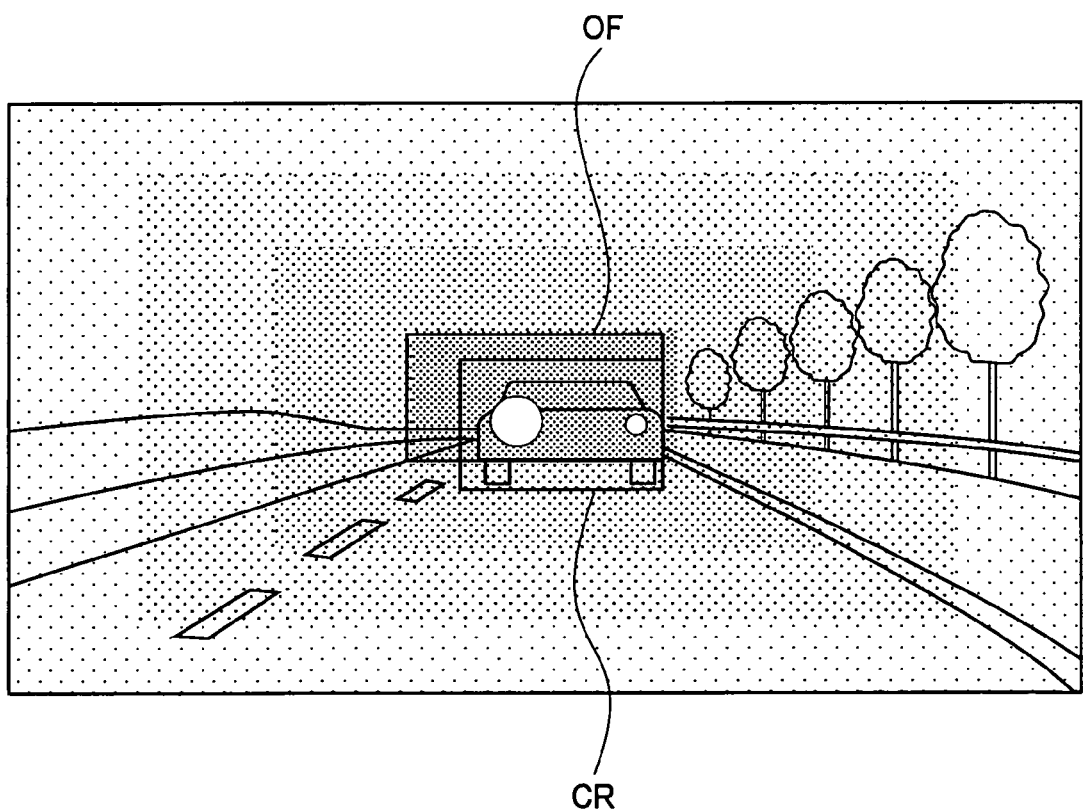
FIG. 12 an exemplary image captured by the vehicle-mounted camera in which a picture of a preceding vehicle is included within the outer frame as detected in step S210 in FIG. 11.

FIG. 12 an exemplary image captured by the vehicle-mounted camera 12 in which the picture of a preceding vehicle is included within the outer frame as detected in step S210 in FIG. 11.

Figure 13:
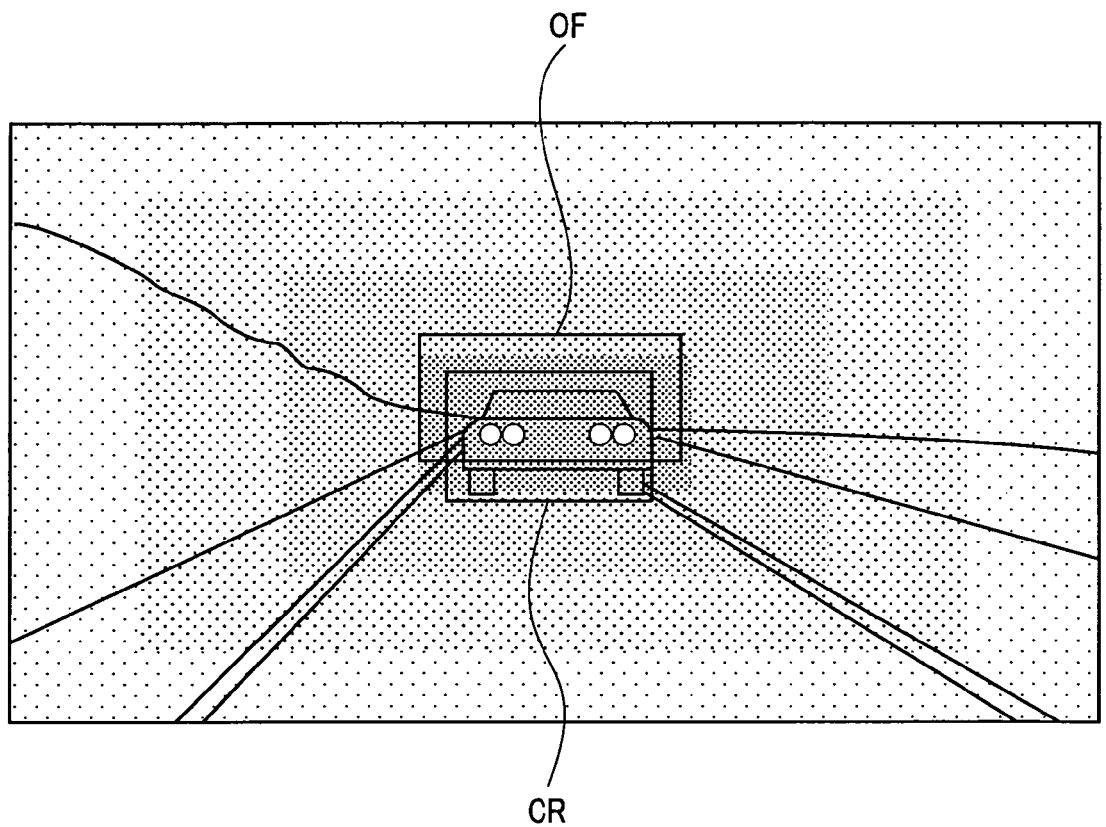
FIG. 13 is another exemplary image captured by the vehicle-mounted camera in which a picture of a preceding vehicle is included within the outer frame as detected in step S210 in FIG. 11.

FIG. 13 is another exemplary image captured by the vehicle-mounted camera 12 in which the picture of a preceding vehicle is included within the outer frame as detected in step S210 in FIG. 11.

It is preferable that the obstacle detecting block 14aα includes a high-luminance obstacle detecting block that detects a high-luminance obstacle which is located ahead of the vehicle and whose picture is included in the reference image to determine an area including the picture of the high-luminance obstacle in the reference image. The high-luminance object is defined as an obstacle having higher luminance than a predetermined value. If the high-luminance obstacle exists, the masking block 14b also masks the area including the picture of the high-luminance obstacle in addition to the picture of a preceding vehicle, as shown in FIGS. 14 and 15.

Figure 14:
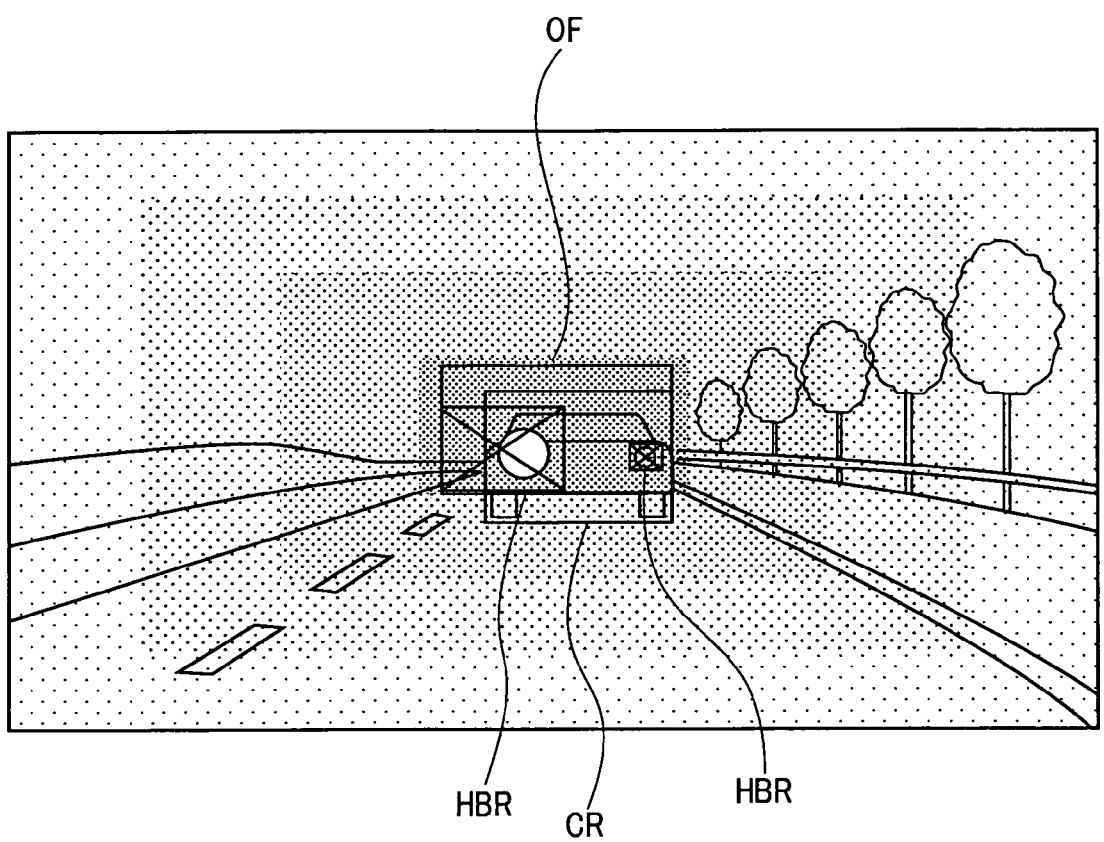
FIG. 14 is an exemplary image captured by the vehicle-mounted camera in which a picture of a tail lamp having a higher luminance in the image is included within the outer frame.
Figure 15:
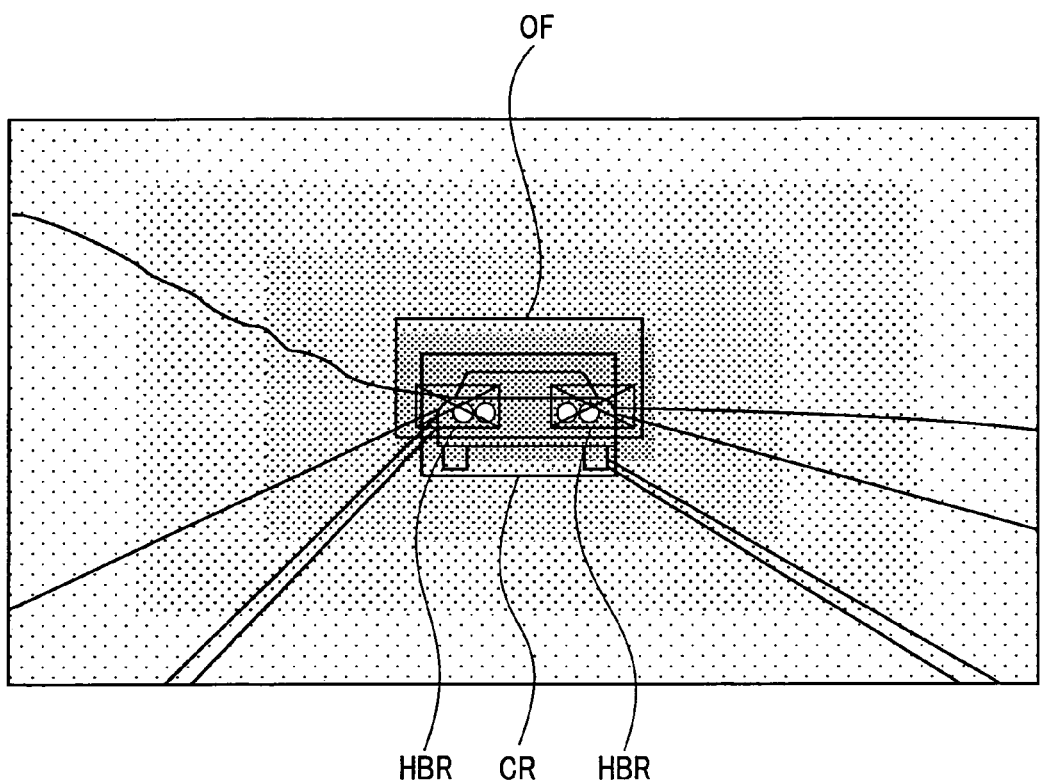
FIG. 15 is another exemplary image captured by the vehicle-mounted camera in which a picture of a tail lamp having a higher luminance in the image is included within the outer frame.
Figure 16:
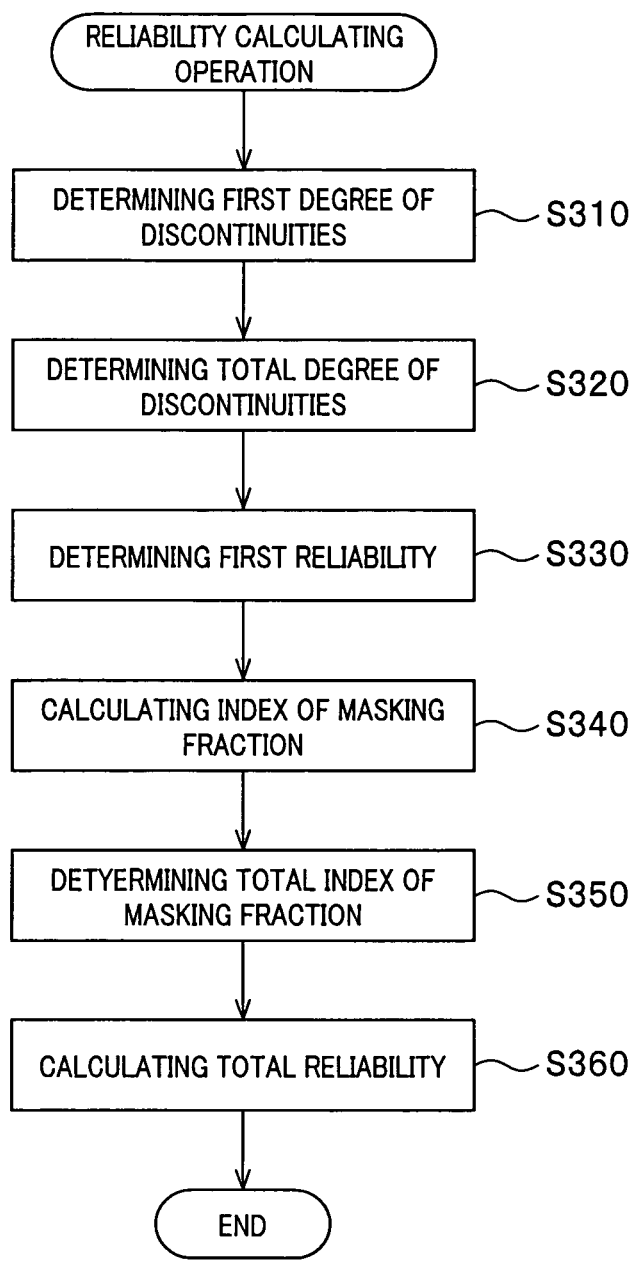
FIG. 16 a flowchart showing a detail of calculating a reliability of the determination of the presence of fog in step S300 in FIG. 2.

FIGS. 14 and 15 are an exemplary images captured by the vehicle-mounted camera 12 in which the picture of a tail lamp is included within the outer frame. The tail lamp of the preceding vehicle is an example of the high-luminance obstacle.

Next, referring to FIGS. 16 to 20, the reliability calculating operation in which the reliability of the determination of the presence of fog is calculated in step S300 in FIG. 4 will be explained. The reliability of the determination of the presence of fog is calculated based on the masked reference image obtained in step S200.

First, in steps S310 and S320, a total degree of discontinuity is calculated. These steps S310 and S320 define a degree of discontinuity calculating means.

In step S310, a first degree of discontinuity in the masked reference image obtained in step S200 in FIG. 4 is calculated. The first degree of discontinuity is defined as a number n of discontinuities that can be found in each of input signals such as each of sweep-lines in the masked reference image obtained in step S200 in FIG. 4 during being performed in step S400 in FIG. 4. The masking operation in step S200 in FIG. 4 divides the reference image obtained in step S100 in FIG. 4 into several zones while generating the degree of discontinuity.

In detail, one input signal that will be used in the spatial frequency analysis in step S400 in FIG. 4 includes information about an array of pixels in a sweep-line in either horizontal or vertical directions. Thus, the first degree of discontinuity can be defined as a number n of discontinuities that can be assigned to each of the input signals.

Figure 17:
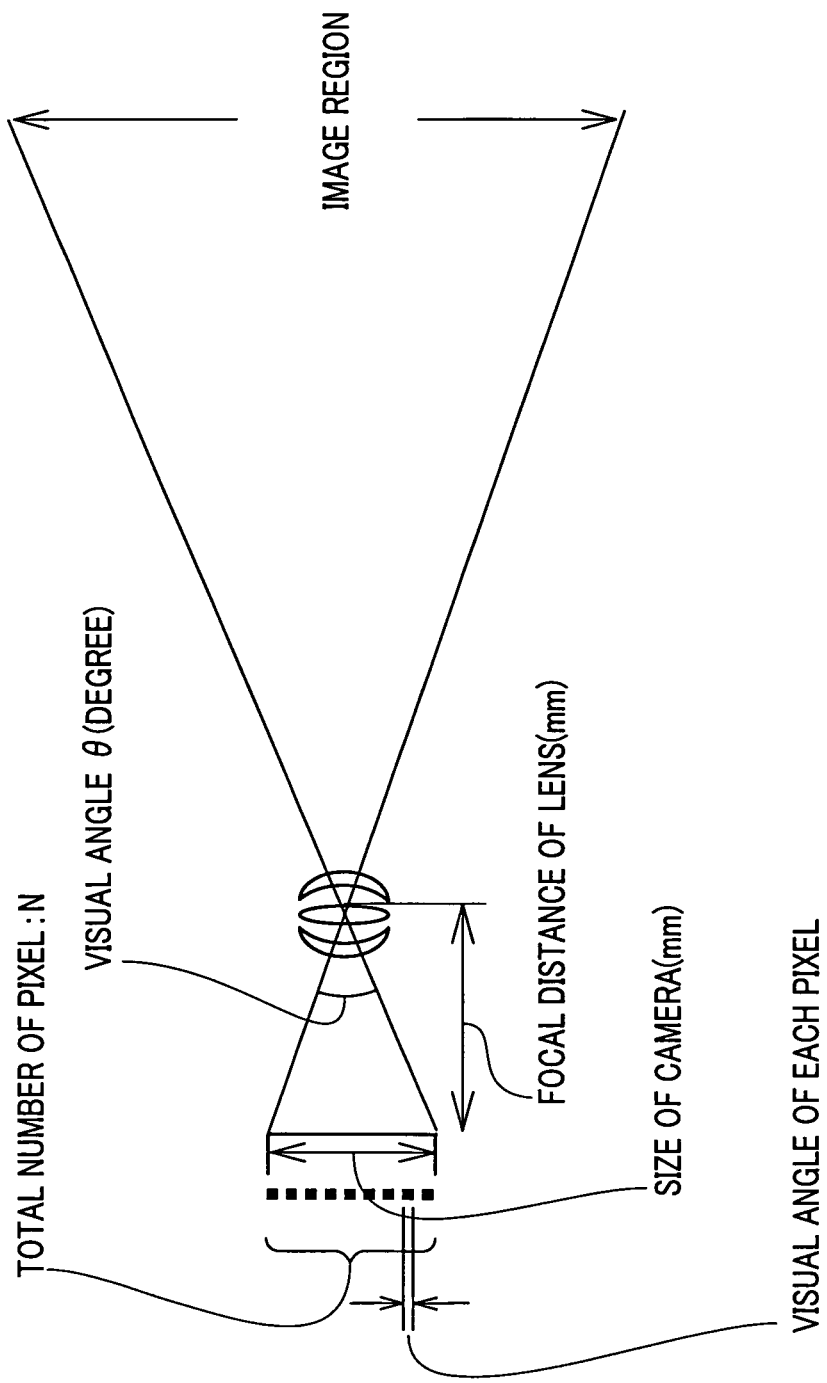
FIG. 17 is an exemplary image obtained by the masking operation in which the picture of the preceding vehicle is masked in step S200 in FIG. 4, in which there are two portions of the masked image having zero and two discontinuous zones, respectively.

FIG. 17 is an exemplary image obtained by the masking operation in which the picture of the preceding vehicle is masked in step S200 in FIG. 4. In FIG. 17, there are two portions of the masked image having zero and two discontinuous zones, respectively.

Figure 18:
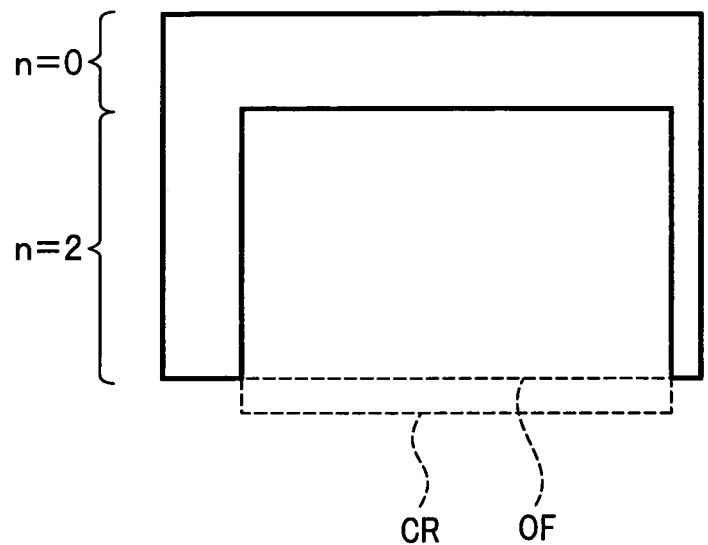
FIG. 18 is another exemplary image obtained by the masking operation in which not only the picture of the preceding vehicle but also the picture of the tail lamp of the preceding vehicle are masked in step S200 in FIG. 4, in which there are two portions of the masked image having zero and two discontinuous zones, respectively.

FIG. 18 is another exemplary image obtained by the masking operation in which not only the picture of the preceding vehicle but also the picture of the tail lamp of the preceding vehicle are masked in step S200 in FIG. 4, in which there are two portions of the masked image having zero and two discontinuous zones, respectively. In FIG. 18, there are three portions of the masked reference image having zero, one and two discontinuous zones, indicating the first degree of discontinuity being zero, one, and two, respectively, if sweep-lines are horizontal lines. In FIG. 18, a contour depicted by solid lines is the contour of the masked reference image obtained in step S200 in FIG. 4.

In step S320, a total degree of discontinuity is obtained. The total degree of discontinuity is defined as a fraction of sweep-lines whose degree of discontinuity having larger than a predetermined value, for example, n=2.

Next, in step S330, a first reliability is calculated based on the total degree of discontinuity obtained in step S320. The first reliability of determining the presence of fog depends on the total degree of discontinuity as a curve shown in FIG. 19.

Figure 19:
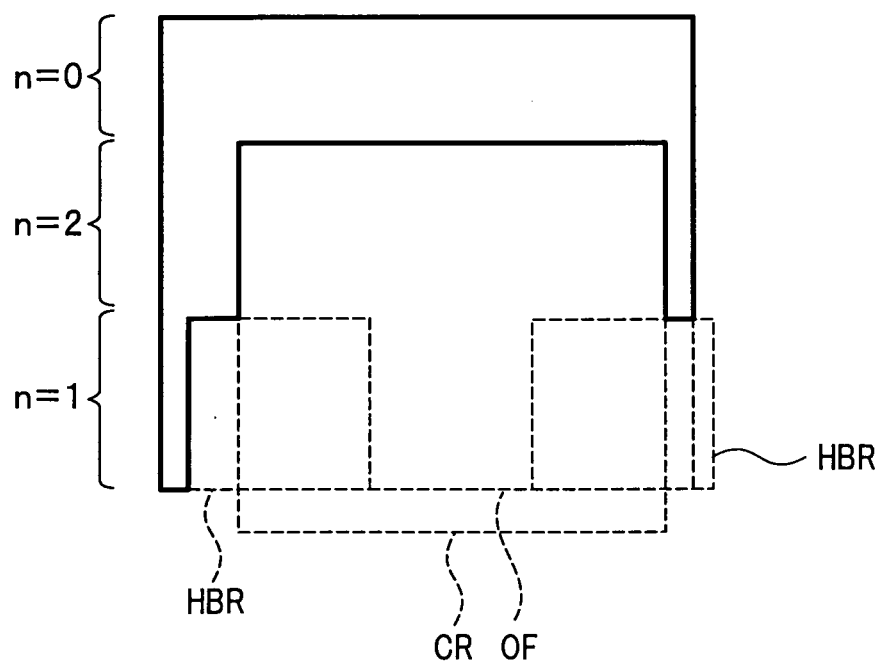
FIG. 19 is a graph showing a relationship between a total degree of discontinuity and a reliability of determining the presence of fog, the relationship being used in step S330 in FIG. 16.

FIG. 19 is an exemplary graph showing a relationship between the total degree of discontinuity and the first reliability of determining the presence of fog.

As shown in FIG. 19, in the relationship between the total degree of discontinuity and the first reliability of determining the presence of fog, if the total degree of discontinuity is equal to or smaller than a predetermined criteria value ST1, the first reliability is perfect, i.e., 100%. As the total degree of discontinuity becomes larger from the predetermined criteria value ST1, the first reliability gradually is reduced to a minimum value. It should be noted that the first reliability is suddenly reduced from 100% to 0% within a small range of the total degree of discontinuity. The first reliability curve against the total degree of discontinuity is illustrated as one in FIG. 19 because the reliability of the accuracy of the spatial frequency analysis is substantially proportional to the length of input signal due to the inherent characteristics of the spatial frequency analysis. In other words, the reliability of the spatial frequency analysis is reduced as the number of discontinuities in one sweep-line or in the length of one input signal is increased. In the spatial frequency analysis, a larger amount of information compared with a threshold value in the input signal is required to obtain an accurate result thereof.

In step S340, an index of masking fraction of the masked reference image is calculated. The operation in this step is carried out by an index of masking fraction calculating means. In this step, a fraction of the area of the removing region HBR to an area of the reference image is calculated. The fraction determines the index of masking fraction of the masked reference image. In the case where the index of masking fraction of the masked reference image is calculated in the manner discussed above, as the index of masking fraction of the masked reference image becomes larger, the area of the removing region HBR, i.e., an area removed from the reference image by masking operation is increased. In this embodiment, the index of masking fraction of the masked reference image is defined as above. However, it is allowed that the index of masking fraction of the masked reference image can be defined as an inverse of the index of masking fraction of the masked reference image. That is, the index of masking fraction of the masked reference image is defined as a fraction of the area of the reference image to the area of the removing region HBR. In this case, as the index of masking fraction of the masked reference image becomes larger, the area of the removing region HBR, i.e., an area removed from the reference image by masking operation is reduced and the area remaining after the masking operation is increased.

Figure 20:
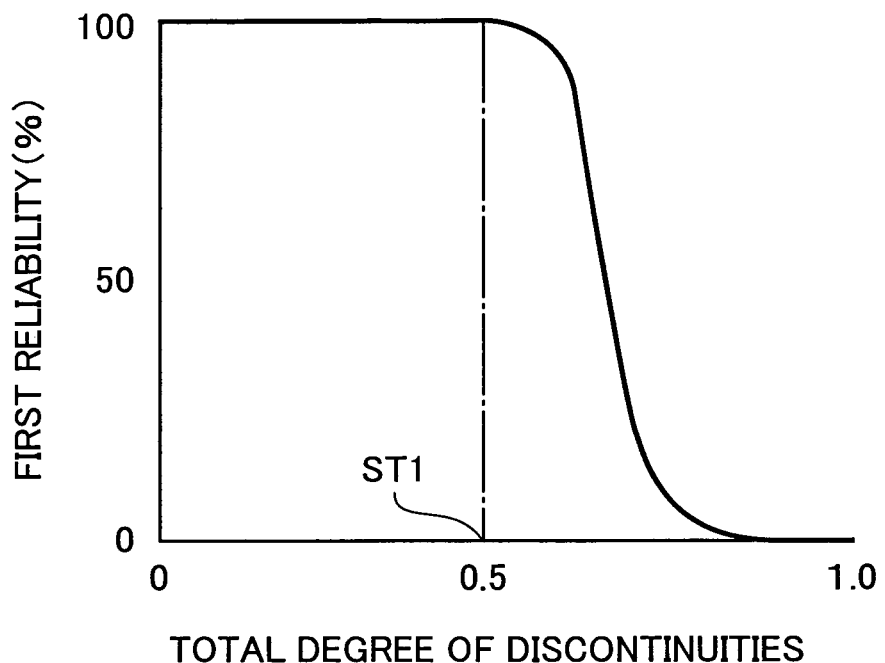
FIG. 20 is a graph showing a relationship between an index of masking fraction of the image and the reliability of determining the presence of fog, the relationship being used in step S350 in FIG. 16.

In step S350, a second reliability is calculated based on the index of masking fraction of the masked reference image. This calculation is performed referring to a predetermined relationship between the index of masking fraction of the masked reference image and the second reliability of determining the presence of fog as shown in FIG. 20. FIG. 20 is a graph showing the relationship between the index of masking fraction of the masked reference image and the second reliability of determining the presence of fog.

As shown in FIG. 20, in the relationship between the index of masking fraction of the masked reference and the second reliability of determining the presence of fog, if the index of masking fraction of the masked reference is equal to or smaller than a predetermined criteria value ST2, the first reliability is perfect, i.e., 100%. As the index of masking fraction of the masked reference becomes larger from the predetermined criteria value ST2, the reliability gradually reduces to a minimum value. It should be noted that the first reliability is suddenly reduced from 100% to 0% within a small range of the index of masking fraction of the masked reference. The first reliability curve against the total degree of discontinuity is illustrated as one in FIG. 20 because the reliability of an accuracy of the spatial frequency analysis is substantially proportional to a length of input signal due to the inherent characteristics of the spatial frequency analysis. In other words, the reliability of the spatial frequency analysis is reduced as the fraction of the area of the removing region HBR to the total area of the reference image is increased. In the spatial frequency analysis, a larger amount of information compared with a threshold value in the input signal is required to obtain an accurate result thereof. Therefore, if the index of masking fraction of the masked reference exceeds to the predetermined criteria value ST2, the amount of information contained in the masked reference image is not enough to accurately determine whether or not fog is present.

In step 360, a total reliability is calculated based on the first reliability obtained in step S330 and the second reliability obtained in step S350. The total reliability is defined as a product of the first reliability and the second reliability in this embodiment. Further, it is allowed that the total reliability is more complex function of the first reliability and the second reliability, for example, a weighted sum of the first reliability and the second reliability, a weighted sum and the like.

Figure 21:
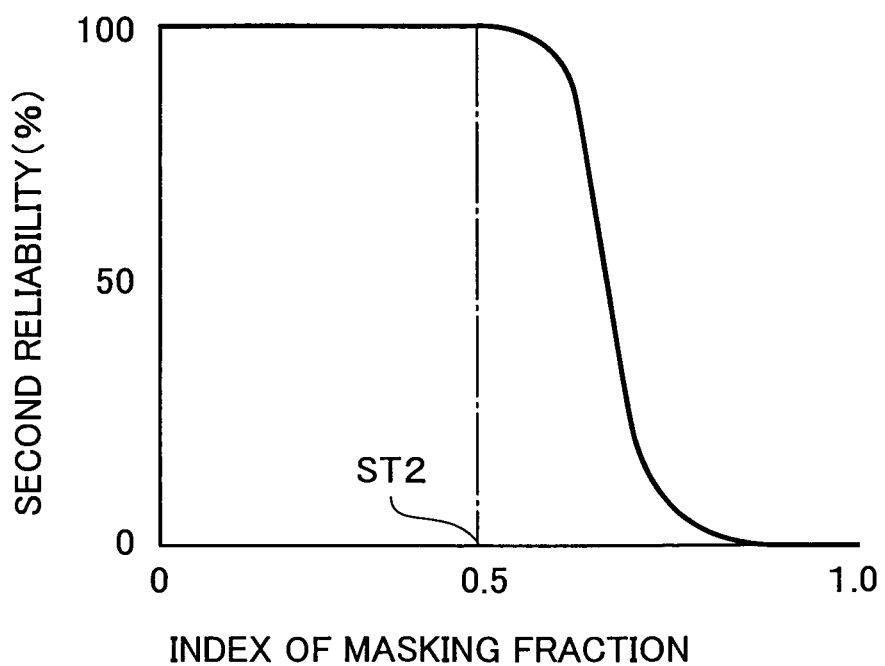
FIG. 21 is a flowchart showing a detailed procedure for performing a spatial frequency analysis on the masked reference image obtained in step S200 in FIG. 4.
Figure 22:
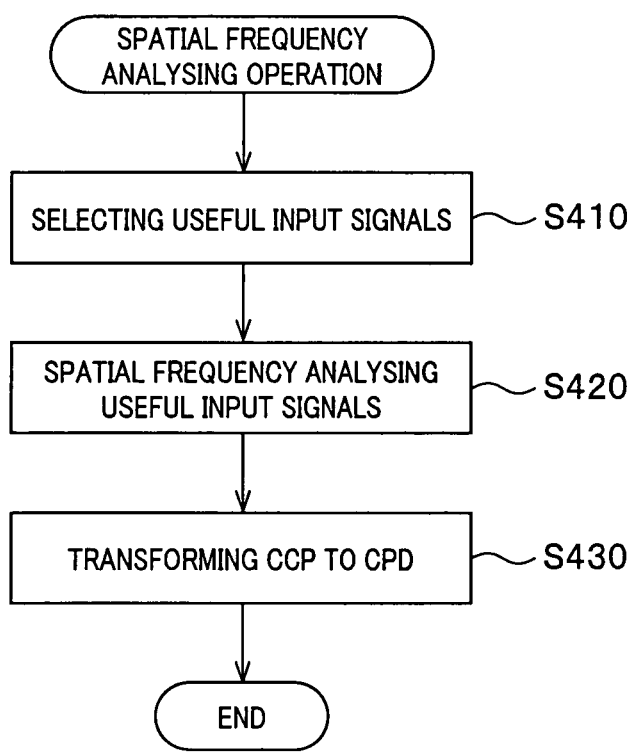
FIG. 22 is a schematic explanation of the spatial frequency analysis including steps of choosing sweep-lines in the masked reference image and applying Fourier transform analysis to sequential data of luminance of pixels in each individual sweep-line in the masked reference image.
Figure 23:
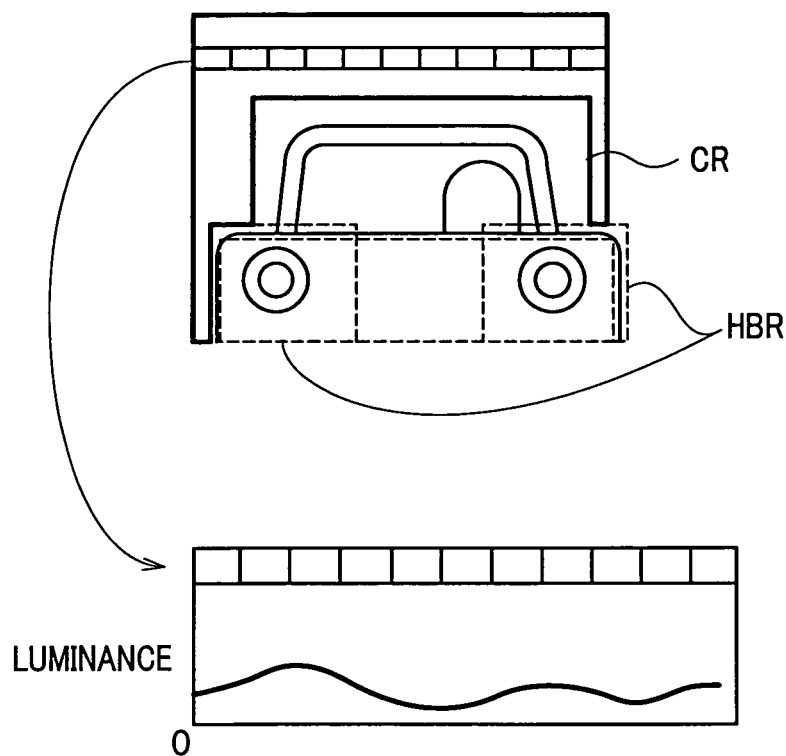
FIG. 23 is a side view of the vehicle-mounted camera illustrating a computation of the visual angle corresponding to one pixel of the vehicle-mounted camera.

Referring to FIGS. 21 to 23, the spatial frequency analyzing operation will be explained in detail.

After the total reliability of determining of whether or not fog is present is calculated in step S300 in FIG. 4, the spatial frequency analysis in step S400 in FIG. 4. and the determination of whether or not fog is present in step S500 in FIG. 4 will be sequentially carried out. These steps define means for determining the presence of fog.

In step S410, among the input signals including information about arrays of pixels contained in sweep-lines of the masked reference image, useful input signals are selected in order to be used in the spatial frequency analysis. To select the useful input signals, it is judged whether or not each of the input signals satisfies a predetermined condition. According to this judgment, the useful input signals are extracted. For example, the condition satisfied by the useful input signals is the degree of discontinuity thereof is smaller than or equal to the predetermined value, for example, n=2 and the fraction of the area of the removing region HBR to the total area of the reference image is smaller than a predetermined value. In this case, if the degree of discontinuity of each of the sweep-lines is 0 or 1, the input signal corresponding to the sweep-line is allowed.

In step S420, a fast Fourier transform is applied to the useful input signals obtained in step S410. Then, a total power spectrum is calculated by summing up the intensity of each of Fourier components obtained as a byproduct in the fast Fourier transform. The total power spectrum indicates that in the Fourier transformed input signals, which of the Fourier component is included and how large an intensity of the Fourier component is if included. The total power spectrum can be shown in a two dimensional graph having a spatial frequency axis of abscissa and a power axis of ordinate.

FIG. 22 is a schematic explanation of the spatial frequency analysis including steps of choosing sweep-lines in the masked reference image and applying Fourier transform analysis to sequential data of luminance of pixels in each individual sweep-line in the masked reference image.

In this stage, the unit of the spatial frequency axis is cycles per pixel (ccp) that is irrespective to human vision. Then, ccp should be transformed into cycles per degree (cpd). This transformation requires the resolution and size of the vehicle-mounted camera 12 and the focal distance of the camera lens installed in the vehicle-mounted camera 12. Human vision is related to the unit of cycles per degree.

FIG. 23 is a side view of the vehicle-mounted camera illustrating a computation of the visual angle corresponding to one pixel of the vehicle-mounted camera 12.

In detail, first, the visual angle of the vehicle-mounted camera 12 is calculated by using the size of the vehicle-mounted camera 12 and the focal distance of the camera 12, as follows:

$$\text{Visual\_angle} = 2 \cdot \frac{180}{\pi} \cdot \tan^{-1}\left(\frac{\text{Size\_of\_camera}/2}{\text{Focal\_distance\_of\_the\_lens}}\right).$$

In the above equation, the visual angle is in degrees, and the size of the vehicle-mounted camera 12 and the focal distance of the lens are in millimeters. The next step is to compute the visual angle for each pixel using the following equation:

$$\text{Visual\_angle\_for\_each\_pixel} = \frac{\text{Visual\_angle\_of\_the\_camera}}{\text{Total\_number\_of\_pixels}}.$$

The final step is to transform ccp to cpd as follows:

$$\text{cycles\_per\_degree} = \frac{\text{cycles\_per\_pixel}}{2'' \times \text{Visual\_angle\_for\_each\_pixel}}.$$

After the step S430 is completed, the determination of whether or not fog is present in step S500 in FIG. 4 will be carried out.

Figure 24:
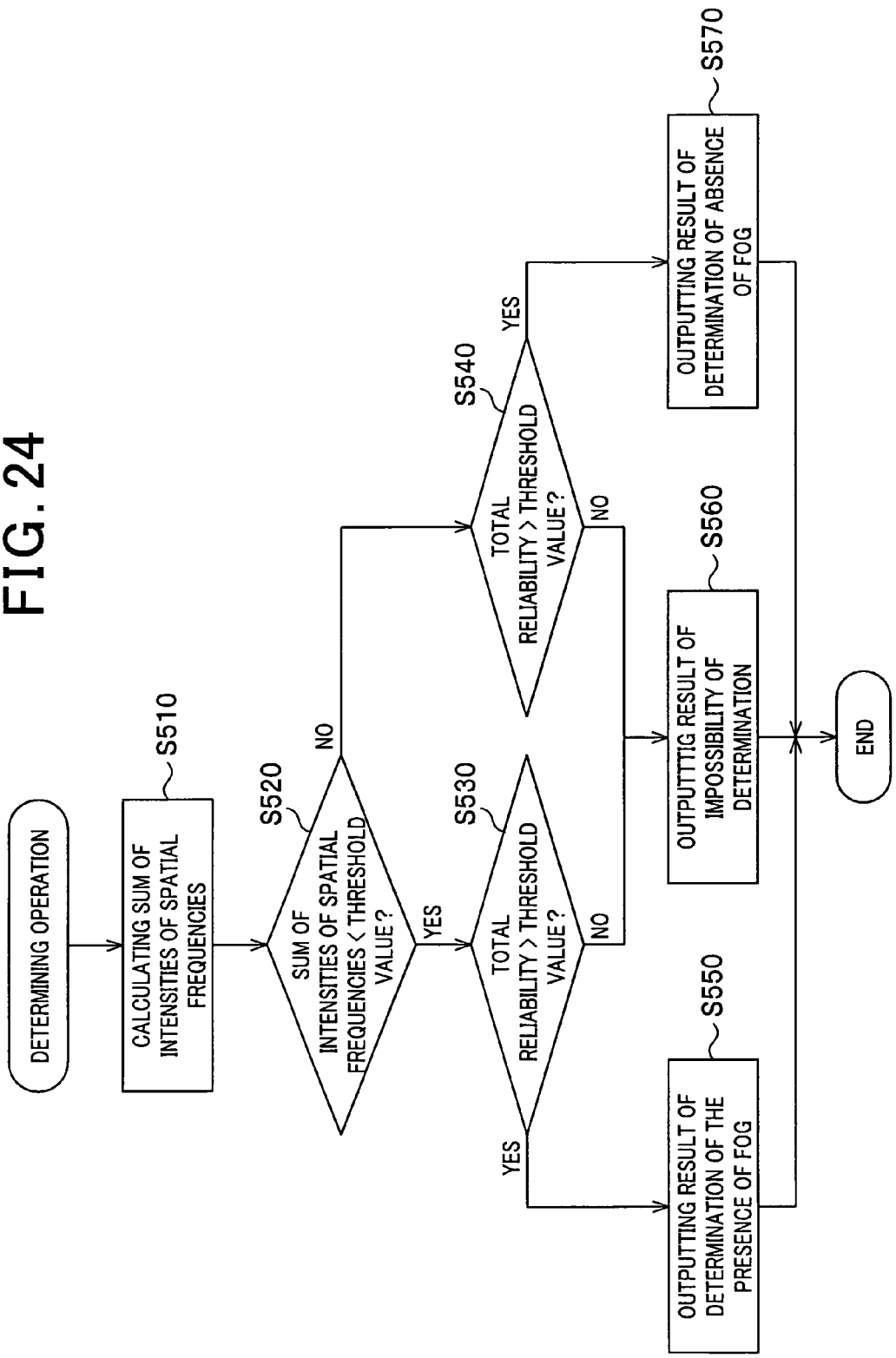
FIG. 24 is a flowchart showing a detailed procedure for performing a determining operation of whether or not fog is present in the space located the predetermined distance forward of the vehicle based on a result of the spatial frequency analysis on the masked reference image obtained in step S400 in FIG. 4.

Referring to FIG. 24, the determination operation will be explained in detail. FIG. 24 is a flowchart showing a detailed procedure for performing a determining operation of whether or not fog is present in the space located the predetermined distance forward of the vehicle based on a result of the spatial frequency analysis on the masked reference image obtained in step S400 in FIG. 4.

In step S510, a sum of intensities of spatial frequencies within a range from 1.5 cpd to 18 cpd is calculated because it is generally said that the human contrast sensitivity in cycles per degree is limited to this range. In this embodiment, the sum of the intensities of the spatial frequencies within the range from 1.5 cpd to 18 cpd is calculated to be used for determining whether or not fog is present in the next step S520. However, it is applicable that the spatial frequencies within a narrower range, or a special frequency at a cpd within the range from 1.5 cpd to 18 cpd, for example, a value of the special frequency at 6 cpd, may be used instead of the sum of the intensities of the spatial frequencies within the range from 1.5 cpd to 18 cpd.

In the subsequent step S520, the sum of intensities of spatial frequencies computed in step S510 is compared with a predetermined reference value. If the sum of intensities of spatial frequencies is smaller than the predetermined reference value, the procedure proceeds to step S530. In contrast to this, if the sum of intensities of spatial frequencies is larger than or equal to the predetermined reference value, the procedure proceeds to step S540.

In step S530, the total reliability computed in step S360 is compared with a predetermined value. If a result of the comparison in step S530 is "YES", that is, the total reliability is larger than the predetermined value, the determination of the presence of fog is obtained. Then, the procedure proceeds to step S550.

In step S550, the result obtained in step S530 is outputted.

In step S540, the total reliability computed in step S360 is compared with a predetermined value. If a result of the comparison in step S540 is "YES", that is, the total reliability is larger than the predetermined value, the determination of the absence of fog is obtained. Then, the procedure proceeds to step S570.

In step S570, the result obtained in step S540 is outputted.

If either the comparisons in steps S530 or S540 is "NO", the procedure proceeds to step S560.

In step S560, the determination of the impossibility for determining the presence of fog is outputted.

Further, it is possible the result obtained in step S530 or S540 is outputted with the total reliability computed in step S360 to a block in which the final judgment of whether or not fog is present is performed. The determinations carried out in steps S520, S530, and S540 are performed based only on the image captured by the vehicle-mounted camera 12. Thus, it is not possible to precisely determine whether or not fog is present in the environment around the traveling vehicle on the road. In the block in which the final judgment of whether or not fog is present is performed, results of a plurality of blocks including the image processing ECU 14 are combined. In this case, more complex judgment of whether the presence of fog based on the sum of intensities of spatial frequencies and the total reliability can be performed.

However, the result obtained in steps S530 or S540 may be used as the final judgment of whether or not fog is present in the environment around the traveling vehicle on the road. In this case, the result obtained in step S520 will be used in the drive support ECU 26 or in the light control ECU 28. What block the result obtained in steps S530 or S540 will be inputted to may depend on the result in steps S530 or S540 itself.

In this embodiment, the masking operation is performed in step S200 in order to remove the effects of obstacles that may generate noise in the spatial frequency analysis. Further, the total degree of discontinuity in the masked reference image is obtained in step S320. If the total degree of discontinuity is equal to or smaller than a predetermined criteria value ST1, the first reliability is set to perfect, i.e., 100%. As the total degree of discontinuity becomes larger from the predetermined criteria value ST1, the first reliability is gradually reduced to a minimum value. Further, in step S340, an index of masking fraction of the masked reference image is calculated. if the index of masking fraction of the masked reference is equal to or smaller than a predetermined criteria value ST2, the first reliability is perfect, i.e., 100%. As the index of masking fraction of the masked reference becomes larger from the predetermined criteria value ST2, the reliability gradually reduced to a minimum value. Further, in step 360, a total reliability is calculated based on the first reliability and the second reliability. The total reliability is defined as a product of the first reliability and the second reliability in this embodiment. In the step S520, the sum of intensities of spatial frequencies is compared with a predetermined reference value. Even if the sum of intensities of spatial frequencies is smaller than the predetermined reference value, it is not finally determined that fog is present. In steps S530 and S540, the total reliability computed in step S360 is compared with a predetermined value. Hence, it is possible to judge whether or not fog is present in the environment around the traveling vehicle on the road based on a result obtained in the image processing ECU 14 taking into account the total reliability. Therefore, an error in the determination whether or not fog is present is reduced and accuracy of the determination is improved.

Second Embodiment

Referring to FIGS. 25 to 28, a second embodiment of the present invention will be explained. The mechanical constituents of the second embodiment are the same members to those of the first embodiment, but the control operations of this embodiment are different from those of the first embodiment.

Figure 25:
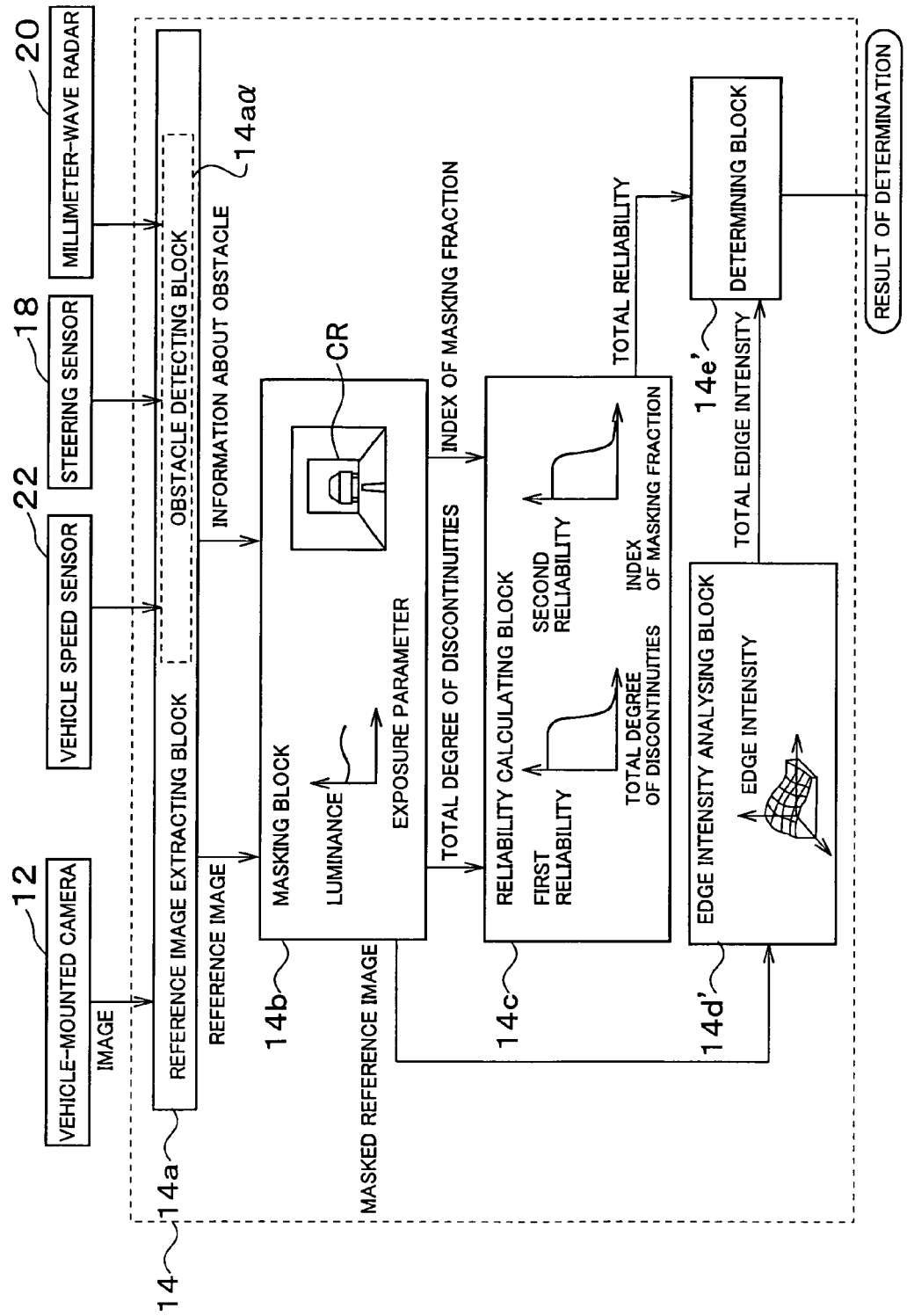
FIG. 25 is a block diagram showing a structure of a vehicle-mounted apparatus that determines the presence of fog including a spatial frequency analyzing block according to a second embodiment of the present invention.

FIG. 25 is a block diagram showing a structure of a vehicle-mounted apparatus 14A according to the second embodiment of the present invention.

In the apparatus 14A, the spatial frequency analyzing block 14d in the first embodiment is replaced with an edge intensity analyzing block 14d'.

The edge intensity analysis is one of the methods for calculating a total edge intensity of an image. An individual edge intensity of the corresponding pixel in the image can be obtained by a differential calculus along a vertical or horizontal direction in the image.

It should be noted that in the edge intensity analysis, the degree of the discontinuities in a sweep-line can not affect any reliability in contrast to the fact that the index of masking fraction of the masked reference image affects the reliability. Thus, in this embodiment where the edge intensity analysis is used instead of the spatial frequency analysis in the first embodiment, steps S310, S320 and S330 are not needed to be performed. That is, the first reliability is equal to the total reliability.

The edge intensity analyzing block 14d' applies an edge operator to each of the pixels in the masked reference image to produce each individual edge intensity of the corresponding the pixel and calculates a total edge intensity as a sum of the individual edge intensities of the pixel in the masked reference image.

Figure 26:
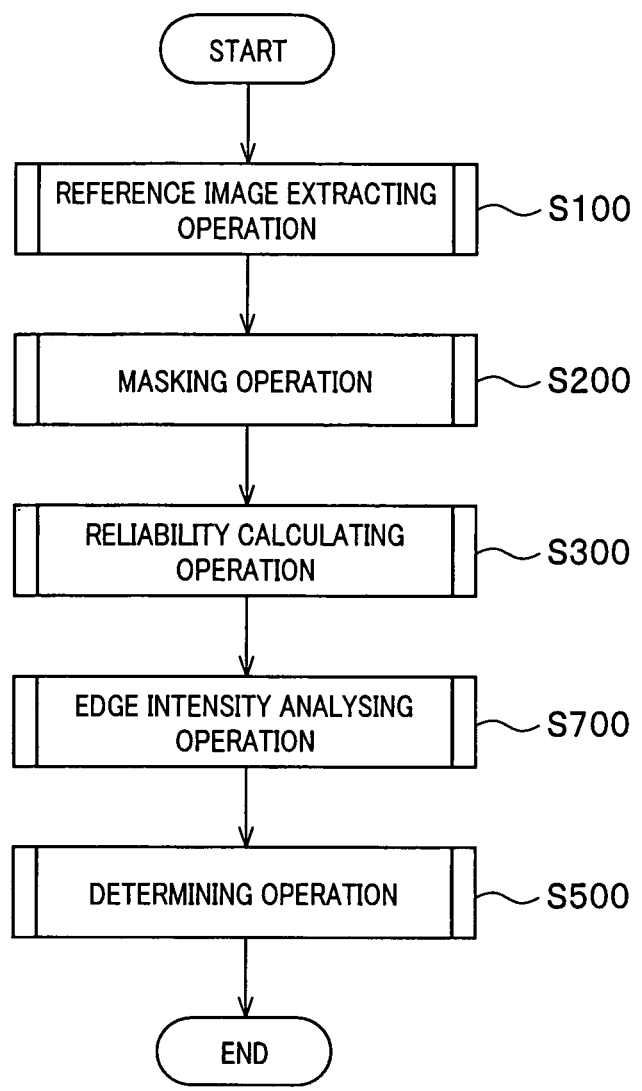
FIG. 26 is a flowchart showing an essence of a control function to be executed by the apparatus according to the second embodiment of the present invention.

FIG. 26 is a flowchart showing a main routine in the control operations to be executed by the image processing ECU 14 according to the second embodiment.

As shown in FIG. 26, the spatial frequency analyzing operation S400 in the first embodiment of the present invention is replaced with the edge intensity analyzing operation S700.

Figure 27:
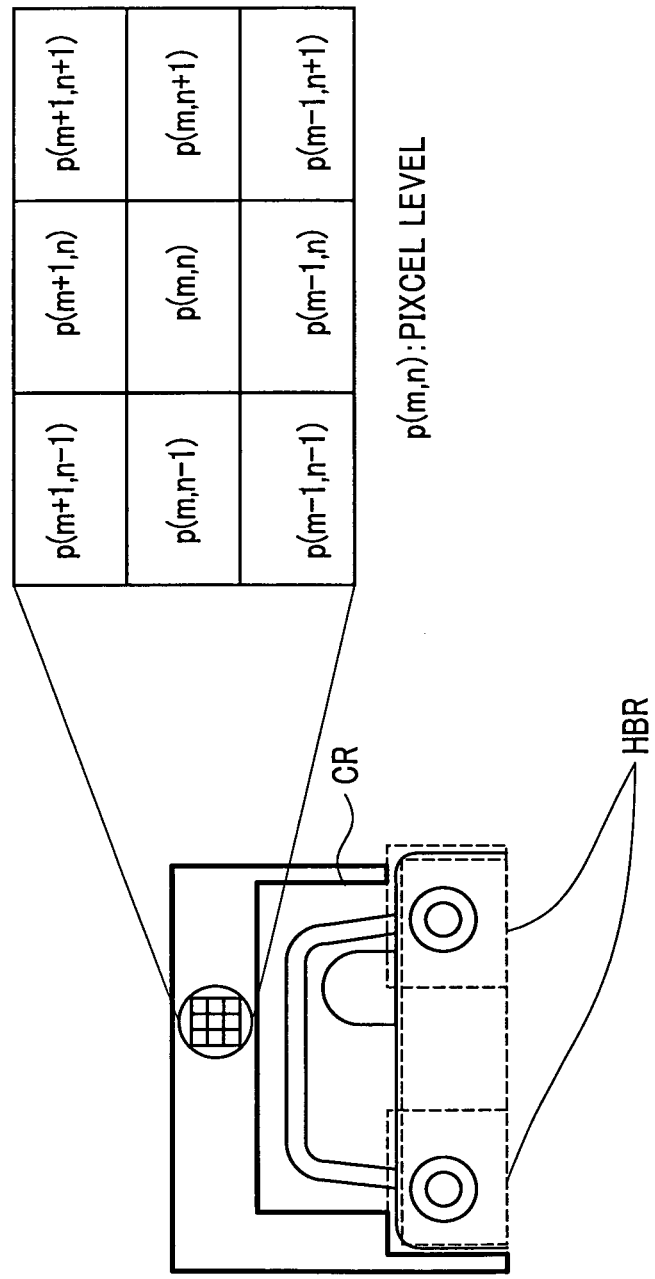
FIG. 27 is a schematic explanation of the edge intensity analysis including a step of applying an edge operator to each individual pixel constituting the masked reference image obtained in step S200 in FIG. 4.

FIG. 27 is a schematic explanation of the edge intensity analysis including a step of applying an edge operator to each individual pixel constituting the masked reference image obtained in step S200 in FIG. 4.

It is well known that the human visual system inherently utilizes edge information for object recognition. Hence in some sense, it is more logical to utilize the degree of edge information for visibility evaluation than other information about the object such as a contrast by luminance. A well known edge operator that has been successfully and widely used is the Sobel operator, which is given by $$S(m,n) = \sqrt{d_x^2 + d_y^2},$$

where $$d_x = [p(m-1, n-1) + 2p(m, n-1) + p(m+1, n-1)] - $$
$$[p(m-1, n+1) + 2p(m, n+1) + p(m+1, n+1)]$$
$$d_y = [p(m+1, n-1) + 2p(m+1, n) + p(m+1, n+1)] - $$
$$[p(m-1, n-1) + 2p(m-1, n) + p(m-1, n+1)],$$

when a two-dimensional discrete coordinate is defined on the image and p(m,n) denotes the pixel value at location (m,n), as shown in FIG. 27. It should be mentioned that other edge operators may be equally eligible. In other words, the performance difference by the choice of different edge operator is negligible. The Sobel operators essentially approximate the gradient of the image by a difference operator.

The total edge intensity $S_{total}$ calculated in the edge intensity analyzing block 14d' in FIG. 25 and the edge intensity analyzing operation S700 in FIG. 26 is given by $$S_{total} = \sum_{m,n} S(m, n).$$

The sum of arguments m and n is carried out over the whole pixels of the masked reference image.

Figure 28:
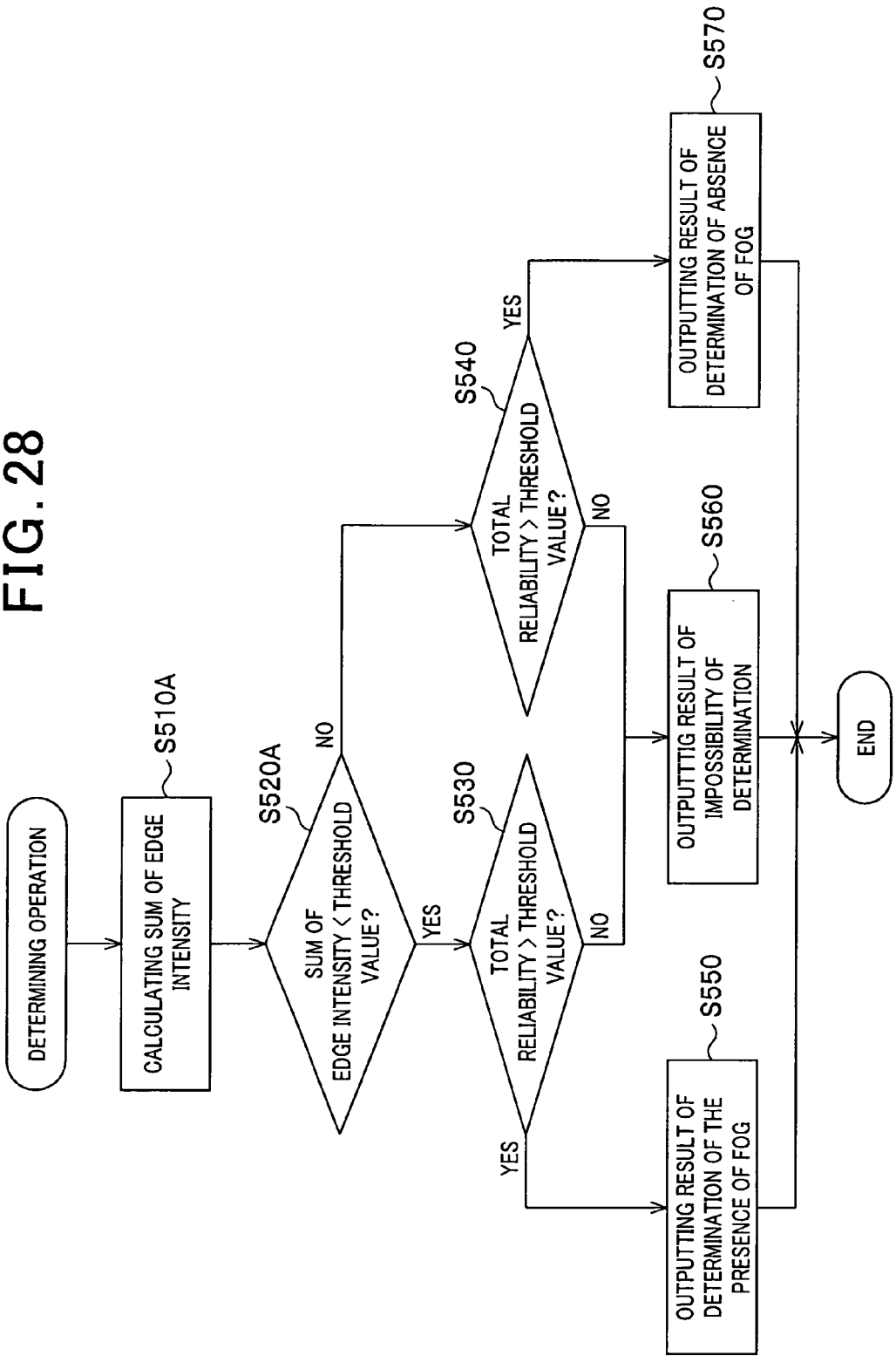
FIG. 28 is a flowchart showing a detailed procedure for performing a determining operation of whether or not fog is present in the space located the predetermined distance forward of the vehicle based on a result of the edge intensity analysis on the masked reference image obtained in step S400 in FIG. 4.

FIG. 28 is a flowchart showing a detailed procedure for performing a determining operation of whether or not fog is present in the space located the predetermined distance forward of the vehicle based on a result of the edge intensity analysis on the masked reference image obtained in step S400 in FIG. 4.

In the determination operation shown in FIG. 28, a calculation of the sum of the edge intensities is performed in step S510A.

In the subsequent step S520A, the sum of intensities of spatial frequencies computed in step S510A is compared with a predetermined reference value. If the sum of intensities of spatial frequencies is smaller than the predetermined reference value, the procedure proceeds to step S530. In contrast to this, if the sum of intensities of spatial frequencies is larger than or equal to the predetermined reference value, the procedure proceeds to step S540.

The operations in other steps than S510A and S520A are the same functional with those in the first embodiment.

In this embodiment, the masking operation is performed in step S200 in order to remove the effects of obstacles that may generate noise in the edge intensity analysis. Further, the total degree of discontinuity in the masked reference image is obtained in step S320. If the total degree of discontinuity is equal to or smaller than a predetermined criteria value ST1, the first reliability is set to perfect, i.e., 100%. As the total degree of discontinuity becomes larger from the predetermined criteria value ST1, the first reliability is gradually reduced to a minimum value. Further, in step S340, an index of masking fraction of the masked reference image is calculated. if the index of masking fraction of the masked reference is equal to or smaller than a predetermined criteria value ST2, the first reliability is perfect, i.e., 100%. As the index of masking fraction of the masked reference becomes larger from the predetermined criteria value ST2, the reliability gradually reduced to a minimum value. Further, in step 360, a total reliability is calculated based on the first reliability and the second reliability. The total reliability is defined as a product of the first reliability and the second reliability in this embodiment. In the step S520A, the sum of edge intensities over the pixels in the masked reference image is compared with a predetermined reference value. Even if the sum of edge intensities is smaller than the predetermined reference value, it is not finally determined that fog is present. In steps S530 and S540, the total reliability computed in step S360 is compared with a predetermined value. Hence, it is possible to judge whether or not fog is present in the environment around the traveling vehicle on the road based on a result obtained in the image processing ECU 14 taking into account of the total reliability. Therefore, an error in the determination whether or not fog is present is reduced and an accuracy of the determination is improved.

Third Embodiment

Figure 29:
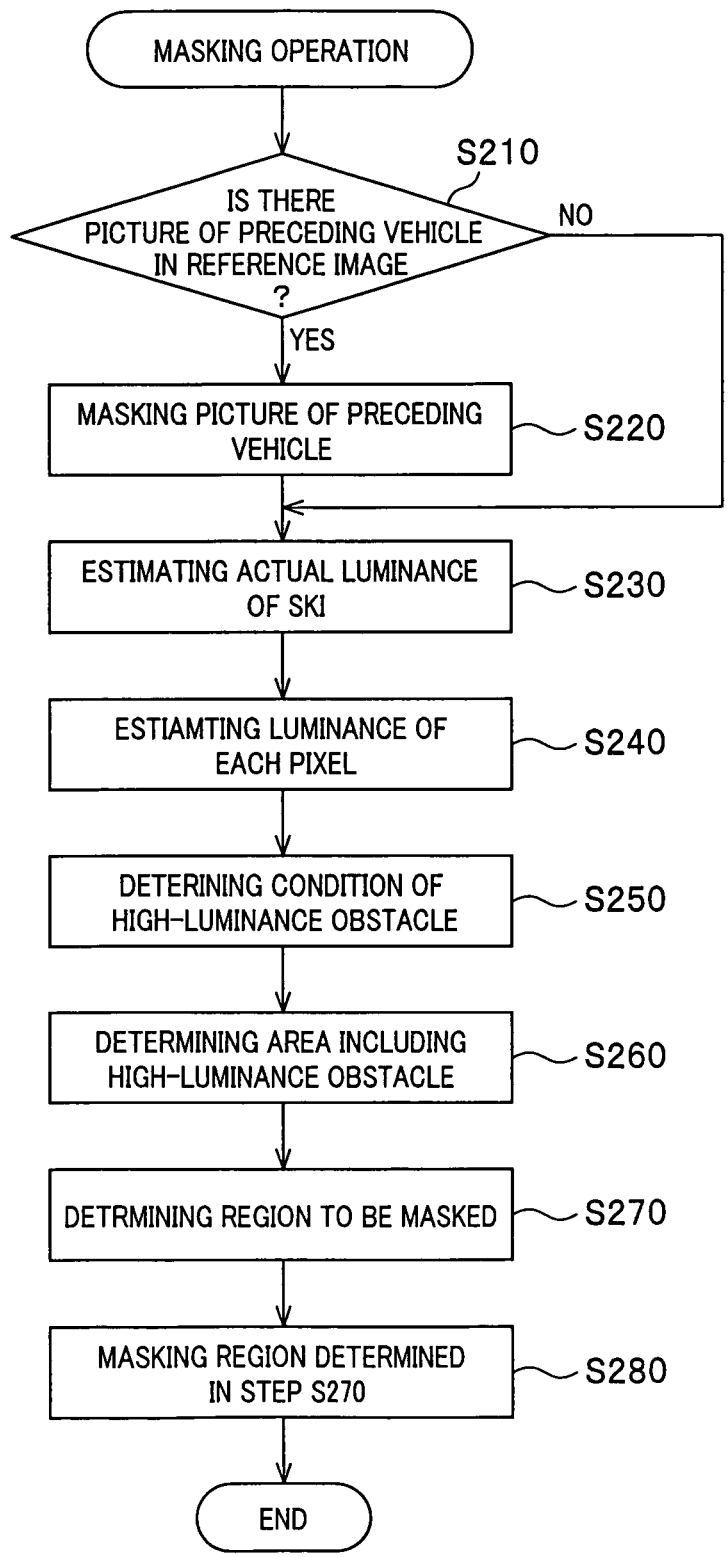
FIG. 29 is a flowchart showing a detail of a masking operation according to a third embodiment of the present invention, in which a picture within the image having possibility to cause noises in image processing for determining the presence of fog will be removed in this masking operation, the picture including not only that of a preceding vehicle but also an obstacle having a higher luminance than that of sky.

Referring to FIG. 29, a third embodiment of the present invention will be explained. The mechanical constituents of the third embodiment are the same members to those of the first and second embodiments, but the control operations of this embodiment are different from those of the first and second embodiments.

In this embodiment, the masking operation in step S200 in FIG. 4 is different with the previous embodiments. Therefore, the structure of the apparatus 10 is the same one with either that of the first embodiment shown in FIG. 3 or that of the second embodiment shown in FIG. 25.

Referring to FIG. 29, the masking operation according to this embodiment will be explained in detail.

FIG. 29 is a flowchart showing a detail of a masking operation in which pictures within the image having possibility to cause noises during image processing for determining the presence of fog will be removed in step S200 in FIG. 4.

The masking operation is started in step S210 by determining whether or not there exists at least a part of a preceding vehicle within the image obtained in step S100. This procedure must be carried out in the following reason. That is, if the preceding vehicle exists ahead of the vehicle on the road over which the vehicle is traveling, a distance to the preceding vehicle from the vehicle equipped the vehicle-mounted camera 12 is one of the shortest distances between an obstacle on the road and the vehicle. In many case, the distance between the preceding vehicle and the vehicle equipped the vehicle-mounted camera 12 is shorter than the given remote distance mentioned in step S110. If it exists, the preceding vehicle gives one of the sources that cause an error during the spatial frequency analysis for determining the presence of fog. Hence, the feature of the preceding vehicle should be removed in the reference image, if exists.

Thus, in step S210, it is judged whether or not the drive support ECU 26 detects the preceding vehicle ahead of the vehicle on the road. If the preceding vehicle exists and is traveling on the road based on the image captured by the vehicle-mounted camera 12, the drive support ECU 26 determines a vehicle zone within the image based on the position within the image and the distance in the real space between the preceding vehicle and the vehicle measured by the millimeter-wave radar 20. Then, within the zone in which the feature of at least a part of the preceding vehicle is included, a contour and a region CR of the preceding vehicle part of the vehicle zone is specified based on an analysis on luminance of pixels constituting the image captured by the vehicle-mounted camera 12. The region CR within the image captured by the vehicle-mounted camera 12 is compared with the reference image cut out in the extracting operation to determine the existence of a partial or an entire overlap between the region CR and the reference image obtained in step S100 in FIG. 2. In FIGS. 3 and 4 which are exemplary images captured by the vehicle-mounted camera 12, the respective regions CR of the picture of the preceding vehicle determined by the steps discussed above are shown. Both in FIGS. 3 and 4, the region CR of the picture of the preceding vehicle and the reference image are partially overlapped.

If the determination in step S210 is "NO", the procedure proceeds directly to step S230. In contrast to this case, that is, if the determination in step S210 is "YES", the procedure proceeds to step S220. In step S220, an overlapped region in which the region CR of the picture of the preceding vehicle and the reference image are overlapped within the reference image is removed, and then the procedure proceeds to step S230.

Either after the step S220 is completed or in the case where the determination in step S210 is "NO", steps from S230 to S280 will be operated in order to expel features of lighting objects, more explicitly features of objects whose features within the image having high luminance from the reference image cut out in the extracting operation in step S100. For example, the object having high luminance is defined as one having a luminance greater than or equal to that of sky. As can be seen in Koschmieder's law, an object having luminance greater than or equal to that of sky is an artificial object whose feature is an origin of noise in the spatial frequency analysis for determining the presence of fog because the object having the luminance greater than or equal to that of sky is not sufficiently blurred and the contour of the object is clearly drawn within the image captured by the vehicle-mounted camera 12.

In step S230, an actual luminance of sky at a location where the vehicle is traveling is determined. The unit of luminance is candelas per unit area ($cd/m^2$). There are methods for determining the actual luminance of sky. One method is based on the image captured by the vehicle-mounted camera 12. Another method is based on values of illuminance detected by illuminance sensor 23. Although both methods are allowed to determine the actual luminance of sky at the location where the vehicle is traveling, one of the methods is predetermined.

In the followings, the detailed discussion will be given in the case where the former method in which the image captured by the vehicle-mounted camera 12 is used is adopted. If there is a region of sky contained within the image, the region of sky occupies an upper portion of the image. This fact leads to a method including steps of: identifying the region of sky within the image captured by the vehicle-mounted camera 12 by extracting an upper predetermined fraction of the image, calculating average values of luminance of each of pixels constituting the region of sky within the image, and estimating the actual luminance of sky based on the calculated average values of luminance of each of pixels in the region of sky by referring to a predetermined relationship between the value of luminance of one pixel and the actual luminance of sky.

The predetermined relationship between the value of luminance of one pixel and the actual luminance of sky will be explained in more detail. As already discussed above, the vehicle-mounted camera 12 captures grayscale or gray scale digital images constituted by pixels each having a value of luminance thereof. Hence, there are correlations between the values of luminance of the pixels of the images captured by the vehicle-mounted camera 12 and the actual luminance of sky. These correlations can be stored as a correlation function or a map. The vehicle-mounted camera 12 has exposure parameters such as a shutter speed, a value of digital gain which effects the correlations between the values of luminance of the pixels of the images captured by the vehicle-mounted camera 12 and the actual luminance of sky. Thus, these exposure parameters should be considered in the correlation function or the map.

Further, the actual luminance of sky is obtained by using only the predetermined upper portion of the image which has high probability for containing the region of sky. For example, a fraction of an area of the predetermined upper portion of the image to the total area of the image is 30 percent. Even if the image captured by the vehicle-mounted camera 12 includes objects other than sky, for example, forest, a tall building, and the like, which have lower luminance than that of sky, the effect of these objects can be reduced by using the predetermined upper portion of the image to calculate the average values of luminance of each of pixels constituting the region of sky within the image. The effect of these objects can also be reduced by applying one of the known image processing techniques. However, it is a simple method for reducing the effect of these objects by using the predetermined upper portion of the image for calculating the average values of luminance of each of pixels constituting the region of sky within the image. In this case, it is preferable that the fraction of the area of the predetermined upper portion to the total area of the image is not too small because if the average values of luminance of each of pixels constituting the region of sky within the image is calculated based on a small number of the pixels, the effect of objects having higher luminance, than the luminance of the sky may not be negligible.

Next, the latter method based on values of illuminance detected by illuminance sensor 23 to calculate the actual luminance of sky will be explained. In general, clear sky can be seen in a day when there is a large amount of solar radiation. Thus, when values of illuminance detected by illuminance sensor 23 are used to obtain the actual luminance of sky, relationships between the values of illuminance and the values of the actual luminance of sky are determined in advance. Hence, it is possible to obtain the actual luminance of sky from the detected values of illuminance of illuminance sensor 23 referring to the relationships between the values of illuminance and the values of the actual luminance of sky.

In step S240, values of the actual luminance ($cd/m^2$) of each pixel constituting the region of sly within the image is calculated based on values of luminance of each of pixels of the reference image referring to the correlations between the values of luminance of the pixels of the images captured by the vehicle-mounted camera 12 and the actual luminance of sky. If the step S220 is carried out, the region CR of the picture of the preceding vehicle is removed from the reference image.

Next, in step S250, a criterion of high luminance is determined based on the actual luminance of sky calculated in step S250. As explained above, an object having high luminance is defined as an object having the luminance greater than or equal to that of sky. Hence, the typical value of the criterion of high luminance is, for example, obtained by multiplying a predetermined factor with the actual luminance of sky. The predetermined factor is a number smaller than or equal to 1 and nearly 1. The object having high luminance includes a lamp and other lighting object, and a reflector and other object having high reflectivity of light. The object having high luminance can cause noise during image processing for determining the presence of fog, in particular in the spatial frequency analysis for determining the presence of fog.

In step S260, the criterion of high luminance obtained in step S250 and values of the actual luminance of each of pixels constituting the region of sky within the image obtained in step S240 are compared. As a result of this comparison, a high luminance zone in which the object having high luminance is included is determined. Each pixels of the high luminance zone within the image has higher luminance than that of sky.

In step S270, a removing region HBR that covers the high luminance zone and larger area than the high luminance zone is determined. The high luminance zone obtained in step S260 is located almost at the center of the removing region HBR. That is, the removing region HBR is obtained by extending the high luminance zone along both horizontal and vertical directions. In FIGS. 14 and 15, exemplary removing regions HBR determined by the above mentioned procedure are shown. In these examples, as the high luminance zone has a higher luminance, an extension factor of the removing region HBR from the high luminance zone is set to be larger. It also be allowed that a constant extension factor is applied to the high luminance zone to generate the removing region HBR irrespective of the value of luminance within the high luminance zone.

Next, in step S280, the removing region determined in step S270 is removed from the reference image. Therefore, the masking operation performed in step S200 in FIG. 4 is completed.

In this embodiment, in addition to the picture of preceding vehicle in the reference image, a picture of a high-luminance obstacle is also masked. Further the high-luminance obstacle is explicitly defined as an obstacle having higher luminance than that of sky. Therefore, an error in the determination whether or not fog is present is reduced and an accuracy of the determination is improved.

Fourth Embodiment

Figure 30:
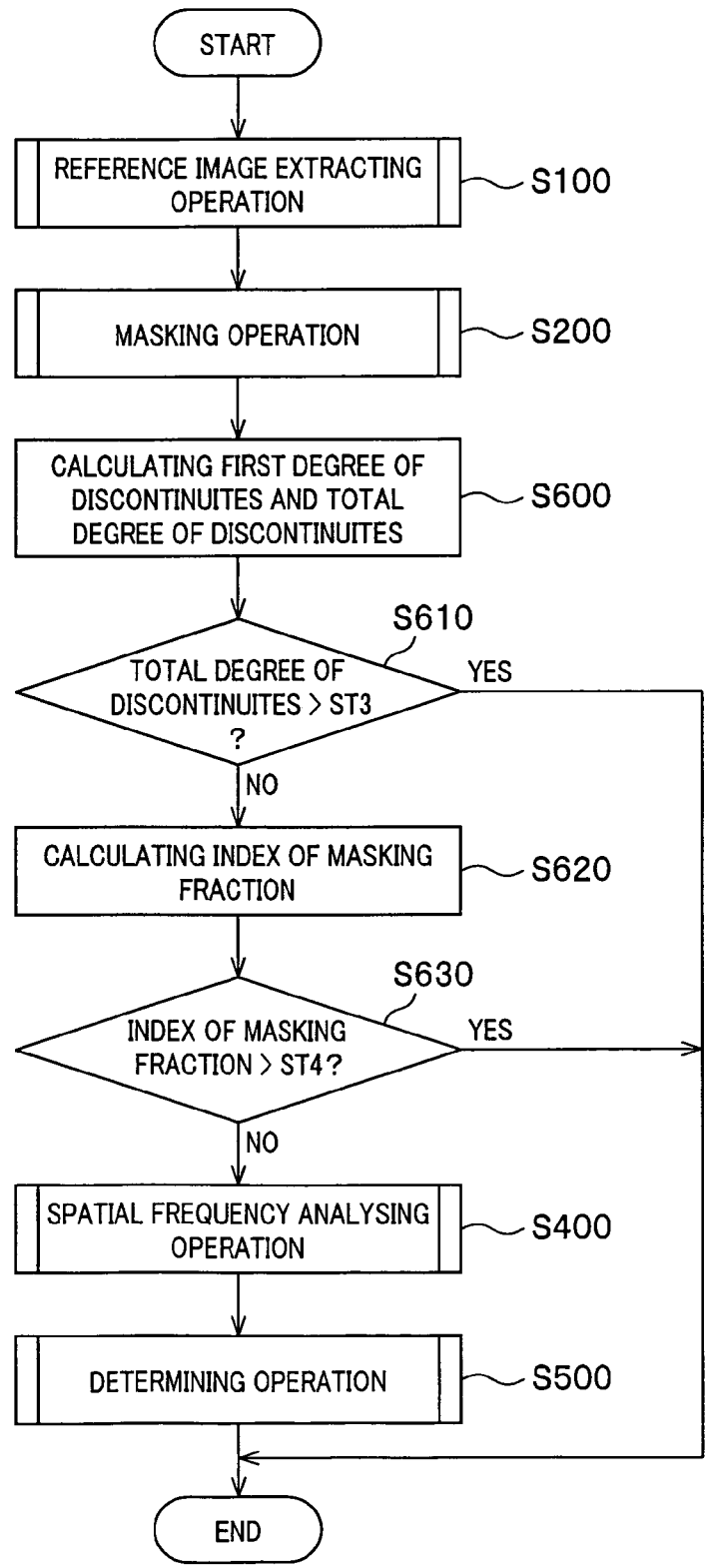
FIG. 30 is a flowchart showing an essence of a control function to be executed by the apparatus according to a fourth embodiment of the present invention.

Referring to FIG. 30, a fourth embodiment of the present invention will be explained. The mechanical constituents of the second embodiment are the same members to those of the first embodiment, but the control operations of this embodiment are different from those of the previous embodiments.

In this embodiment, the masking operation in step S200 in FIG. 4 is different with the previous embodiments. Therefore, the structure of the apparatus 10 is the same one with either that of the first embodiment shown in FIG. 3 or that of the second embodiment shown in FIG. 25.

Referring to FIG. 30, the masking operation according to this embodiment will be explained in detail.

As shown in FIG. 30 according to the present embodiment, the new steps S600, S610, S620, and S630 are executed in the control operations, although the step S300 in FIG. 2 is not executed. Other steps than the steps S600, S610, S620, and S630 in FIG. 13 have the same operations with the steps in FIG. 2. Thus, any detailed description about steps S100, S200, S400, and S500 will be omitted.

In step S600, a first degree of discontinuity and a total degree of discontinuity are calculated, as in steps S310 and S320 in operations shown in FIG. 7 according to the first embodiment, respectively.

In step S610, the first degree of discontinuity obtained in step S610 is compared with a third predetermined criteria value ST3. If the first degree of discontinuity is larger than the third predetermined criteria value ST3, the procedure will directly be terminated without determining whether or not fog is present. In contrast to this case, that is, in the case where the first degree of discontinuity is smaller than or equal to the predetermined criteria value ST3, the procedure proceeds to step S620. It is preferable that the predetermined criteria value ST3 is set to be equal to or slightly smaller than the first predetermined criteria value ST1 which is referenced in step S330.

In step S620, an index of masking fraction of the masked reference image is calculated in the same manner in step S340 in FIG. 7.

Next, in step S630, it is judged whether or not the index of masking fraction calculated in step S620 is larger than a fourth predetermined criteria value ST4. If the judgment in step S630 is "YES", that is, the index of masking fraction calculated in step S620 is surely larger than the fourth predetermined criteria value ST4, the operations performed by the apparatus 10 according to the present invention are instantly terminated. In contrast to this, if the judgment in step S630 is "NO", that is, the index of masking fraction calculated in step S620 is smaller than or equal to the fourth predetermined criteria value ST4, the procedure proceeds to step S400 and then to step S500. In step S400, the spatial frequency analysis on the masked reference image is performed. In step S500, the determining operation for determining whether the presence of fog is performed.

The fourth predetermined criteria value ST4 is comparative to the predetermined criteria value ST2 used in the first embodiment. In more detail, the fourth predetermined criteria value ST4 is slightly smaller than or equal to the predetermined criteria value ST2

According to the present embodiment, an error of the determination whether or not fog is present is reduced and an accuracy of the determination is improved because if either the first degree of discontinuity obtained in step S610 is larger than the third predetermined criteria value ST3 or the index of masking fraction calculated in step S620 is surely larger than the fourth predetermined criteria value ST4, the operations performed by the apparatus 10 according to the present invention are instantly terminated. Thus, the apparatus 10 concludes that the determination of whether the presence of fog is impossible when an amount of information contained in the masked reference image is not sufficient.

Modification of the Fourth Embodiment

It is applicable that the edge intensity analysis can be utilized instead of the spatial frequency analysis. In this case, step S700 in FIG. 26 is performed instead of step S400 in FIG. 30. Further, it is not necessary to perform steps S600 and S610 in FIG. 30. Thus, after the step S200 is completed, the step S620 will be performed.

Fifth Embodiment

Referring to FIGS. 31 to 34, a fifth embodiment of the present invention will be explained. The mechanical constituents of the second embodiment are the same members to those of the first embodiment, but the control operations of this embodiment are different from those of the previous embodiments.

Figure 31:
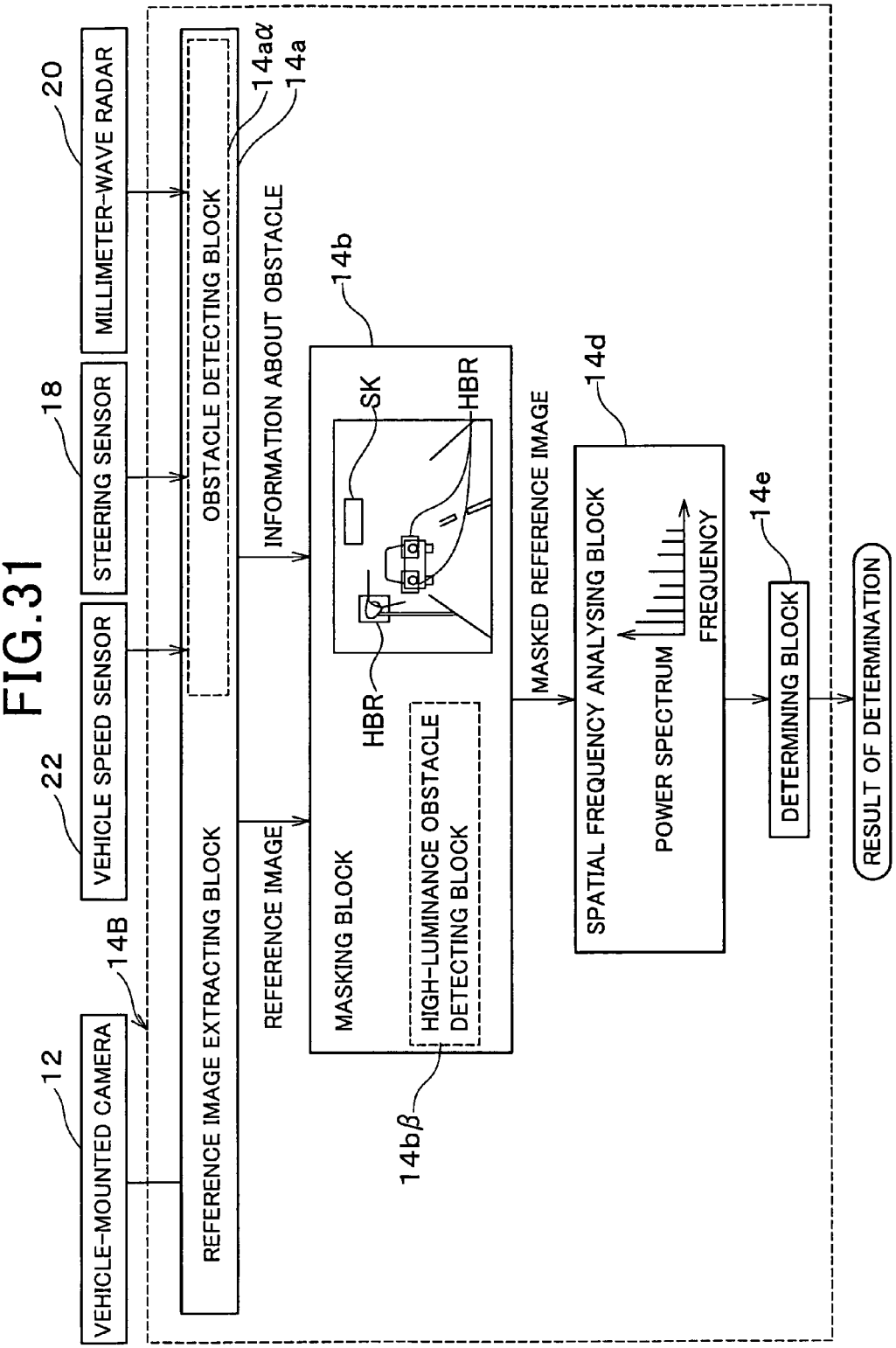
FIG. 31 is a block diagram showing a structure of the image processing unit including a high-luminance obstacle detecting block according to a fifth embodiment of the present invention.

FIG. 31 is a block diagram showing a structure of the image processing unit including a high-luminance obstacle detecting block according to a fifth embodiment of the present invention.

In this embodiment, the reliability calculating operation is not performed. Further, in this embodiment, the masking block 14*b* includes a high-luminance obstacle detecting block 14*b*β that detects a high-luminance obstacle from the reference image, the high-luminance obstacle being higher in luminance than a predetermined luminance value.

Figure 32:
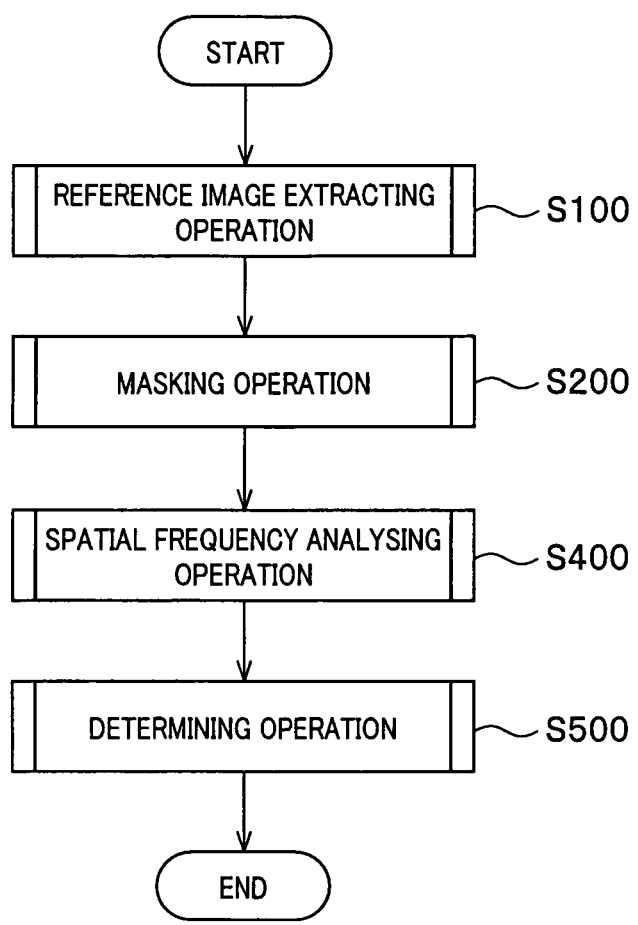
FIG. 32 is a flowchart showing an essence of a control function to be executed by the apparatus according to a fifth embodiment of the present invention.

FIG. 32 is a flowchart showing an essence of a control function to be executed by the apparatus according to a fifth embodiment of the present invention.

In this embodiment, the image processing ECU 14 performs an extracting operation in which a portion of the entire image captured by the vehicle-mounted camera 12 to be used in the determination whether or not fog is present is extracted in step S100. The portion of the entire image to be used in the determination is referred to as a reference image. This extracting operation is performed by means for extracting the portion of the image to be used in the determination whether or not fog is present from the image captured by the vehicle-mounted camera 12. Next, in step S200, a masking operation is performed by means for masking to expel a picture of high-luminance obstacle within the reference image.

Then, in step S400, a spatial frequency analysis is carried out on the masked reference image obtained in step S200. In step S500 that is the next step of the step S400, a determination of whether or not fog is present in the environment of the own vehicle is performed based on a result of the spatial frequency analysis carried out in step S400. The steps S100, S200, S300, S400, and S500 will be discussed in detail with referring to FIGS. 5, 11, 16, and 22, respectively.

Figure 33:
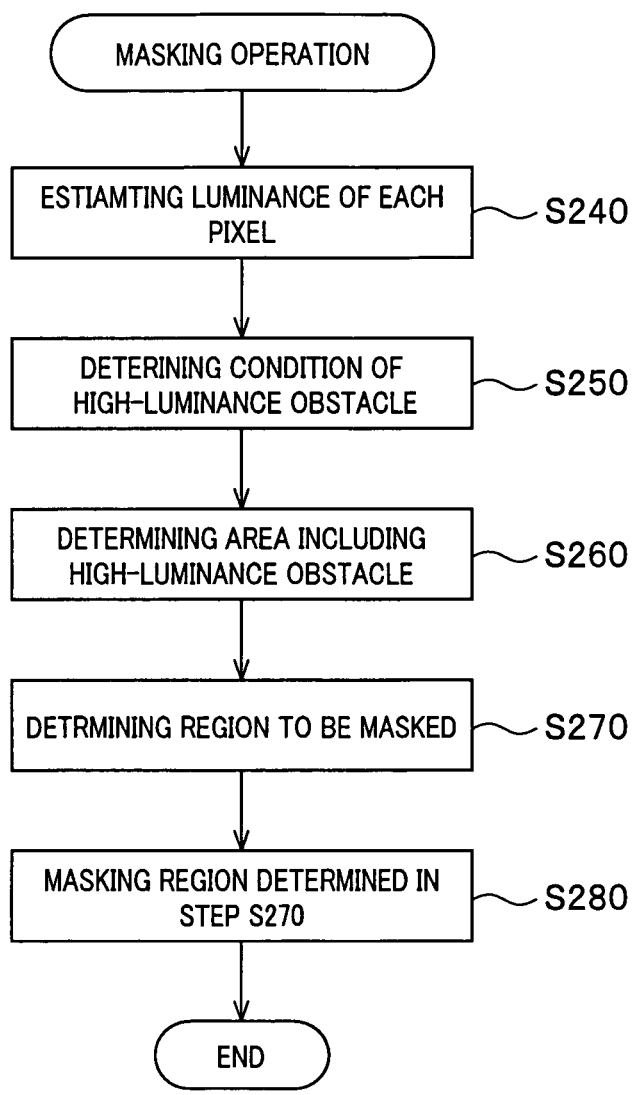
FIG. 33 is a flowchart showing a detail of a masking operation in which a picture of high-luminance obstacle within the image having possibility to cause noises in image processing for determining the presence of fog will be removed in this masking operation.

FIG. 33 is a flowchart showing a detail of a masking operation in which a picture of high-luminance obstacle within the image having possibility to cause noises in image processing for determining the presence of fog will be removed in this masking operation. In this embodiment, only steps from S240 to S280 in FIG. 29 are executed.

Figure 34:
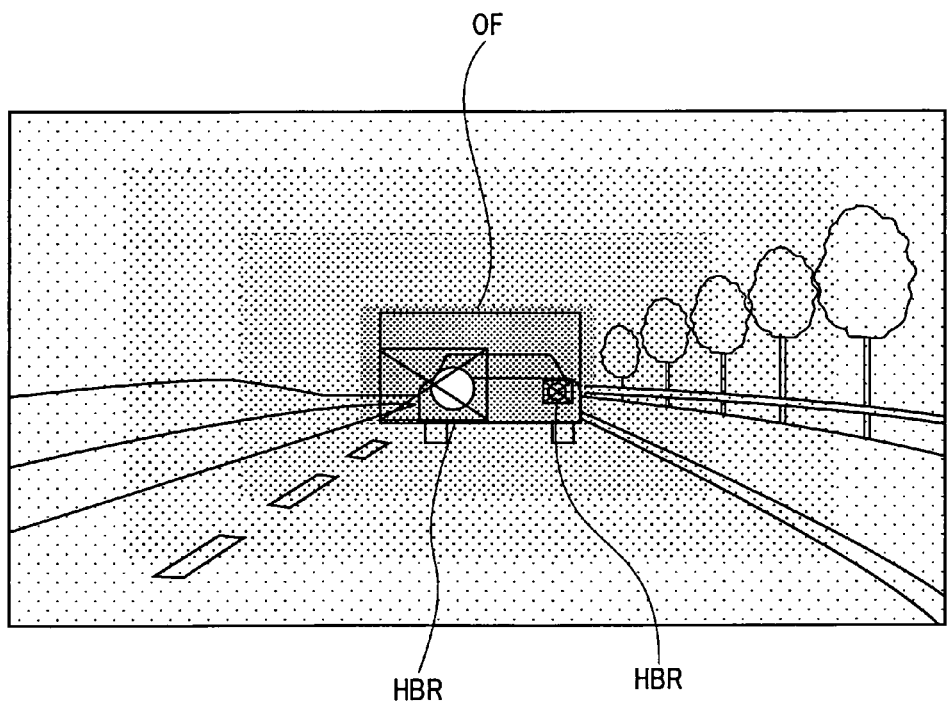
FIG. 34 an exemplary image captured by the vehicle-mounted camera in which a picture of a high-luminance obstacle is included within the outer frame as detected in step S210 in FIG. 11.
Figure 35:
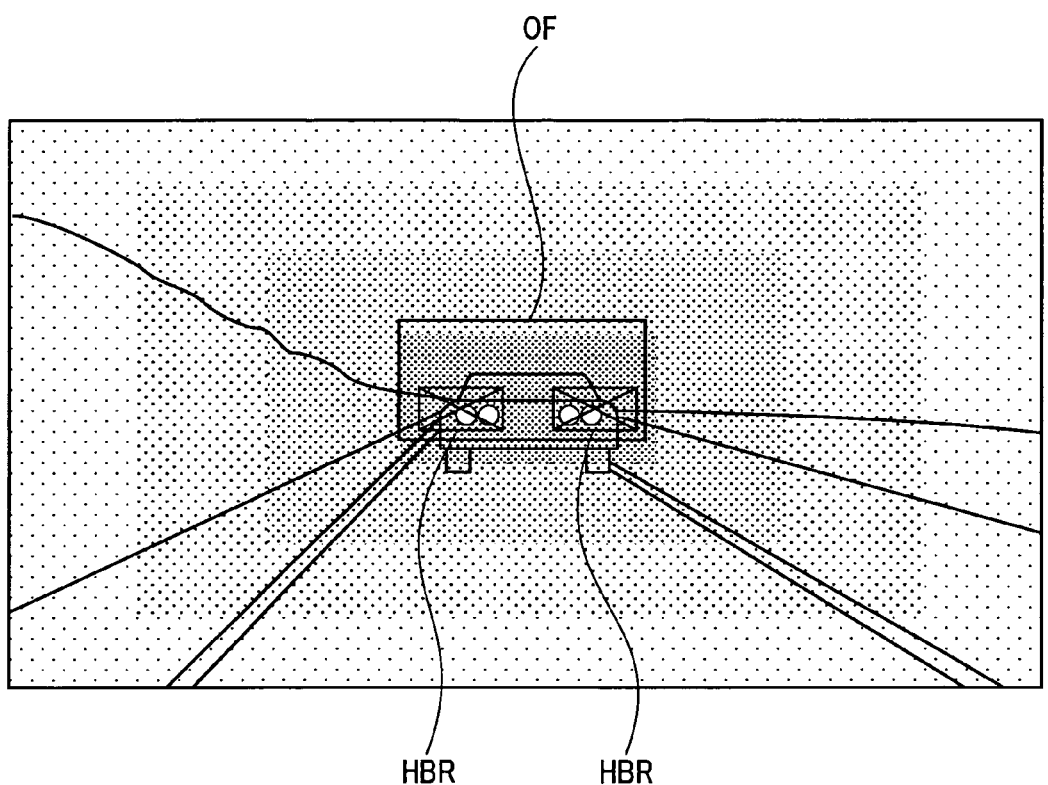
FIG. 35 is another exemplary image captured by the vehicle-mounted camera in which a picture of a high-luminance obstacle is included within the outer frame as detected in step S210 in FIG. 11.

In the masking operation, the picture of the high-luminance obstacle is masked as shown in FIGS. 34 and 35.

FIG. 34 an exemplary image captured by the vehicle-mounted camera in which the picture of the high-luminance obstacle is included within the outer frame as detected in step S210 in FIG. 11.

FIG. 35 is another exemplary image captured by the vehicle-mounted camera in which the picture of the high-luminance obstacle is included within the outer frame as detected in step S210 in FIG. 11.

In this embodiment, in the masking operation, the picture of the high-luminance obstacle which causes the larger noise in the spatial frequency analysis is reliably removed from the reference image. Thus, in the masked reference image, the picture of the high-luminance obstacle is absent. Therefore, it is possible to accurately determines whether the presence of fog in the environmental atmosphere around the vehicle.

Sixth Embodiment

Figure 36:
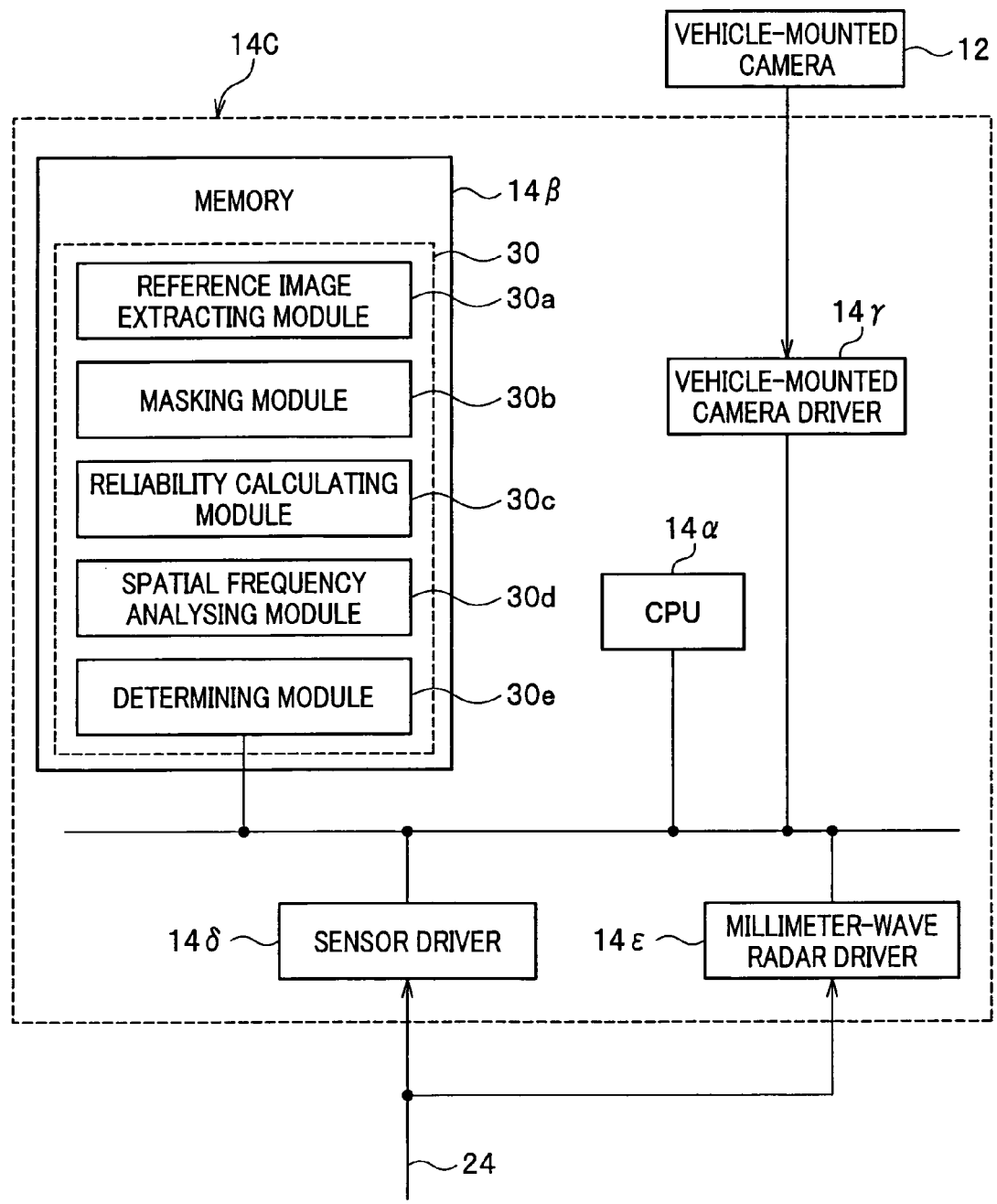
FIG. 36 is a block diagram showing a structure of a vehicle-mounted apparatus that determines the presence of fog including a spatial frequency analyzing block according to a sixth embodiment of the present invention.

Referring to FIG. 36, a sixth embodiment of the present invention will be explained.

In this embodiment, the image processing ECU 14B is replaced with the image processing ECU 14 or 14A in the previous embodiments.

The image processing ECU 14B according to the present embodiment includes a central processing unit (CPU) 14α, a memory 14β, a vehicle-mounted camera operator 14γ, a sensor operator 14δ, and a millimeter-wave radar operator 14ε.

In the memory 14β, a computer program 30 that is executed mainly by the central processing unit (CPU) 14α to perform the steps S100, S200, S300, S400, and S500 in FIG. 4 is stored.

The computer program 30 has a reference image extracting module 30*a*, a masking module 30*b*, a reliability estimating module 30*c*, a spatial frequency analyzing module 30*d*, and a determining module 30*e*. The reference image extracting module 30*a* is executed to perform the step S100 in FIG. 4.

The masking module 30b is executed to perform the step S200 in FIG. 4. The reliability estimating module 30c is executed to perform the step S300 in FIG. 4. The spatial frequency analyzing module 30d is executed to perform the step S400 in FIG. 4. The determining module 30e is executed to perform the step S500 in FIG. 4. These modules constitute of a program, for use with a computer system, the program being tangibly embodied in a computer readable medium and being provided for detecting the presence of a constituent affecting a view of space which is present ahead of a vehicle, the constituent resulting from a natural phenomenon in the space, the program enabling the computer to functionally realizing the above disclosed method.

In the present embodiment, the method according to the present invention can be easily and tangibly carried from a vehicle to another vehicle.

Modification of the Sixth Embodiment

Figure 37:
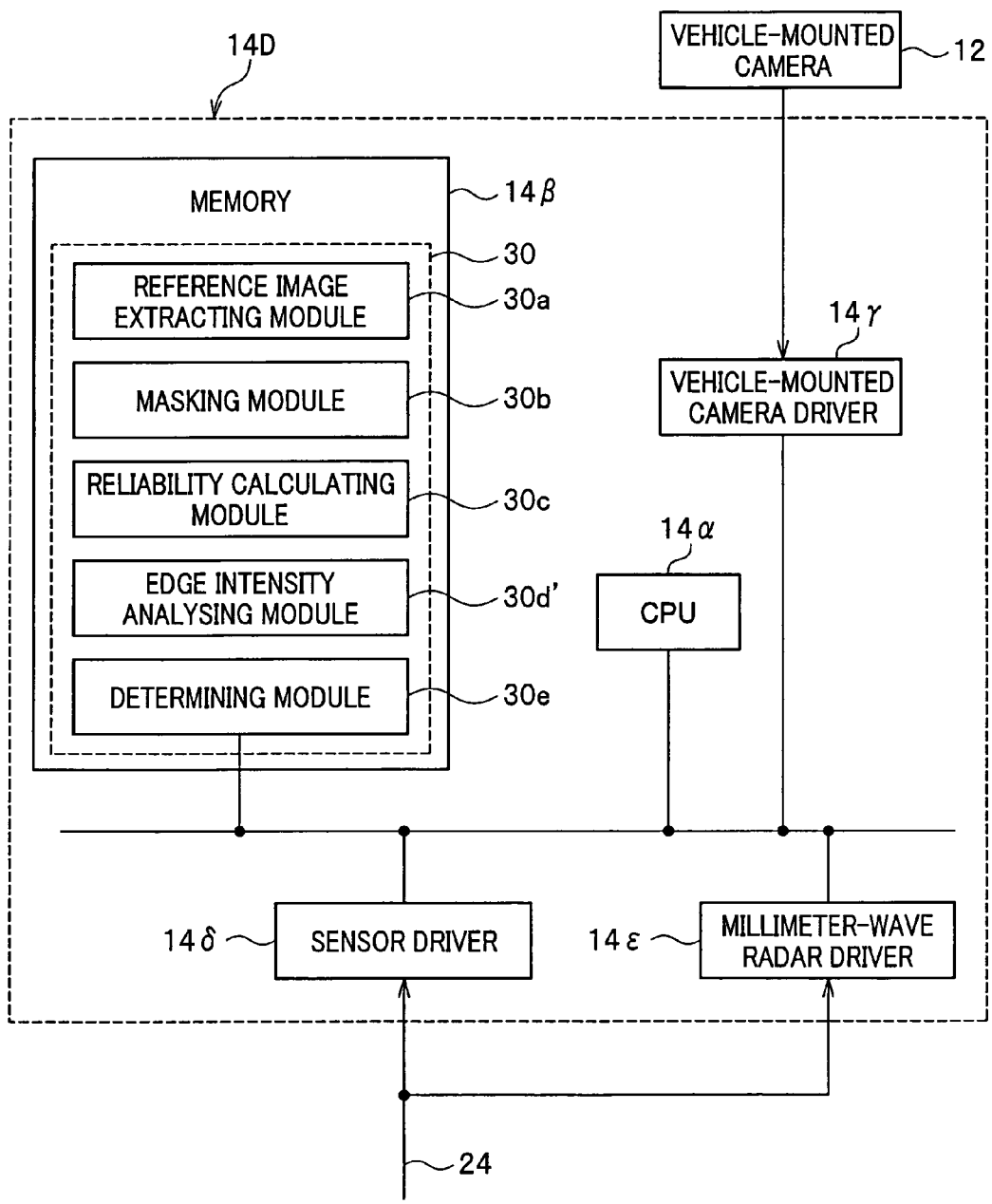
FIG. 37 is a block diagram showing a structure of a vehicle-mounted apparatus that determines the presence of fog including a spatial frequency analyzing block according to a modification of the sixth embodiment of the present invention.

Referring to FIG. 37, a modification of the sixth embodiment of the present invention will be explained.

In the modification of the sixth embodiment, an edge intensity analyzing module 30d' is used instead of the spatial frequency analyzing module 30d in the sixth embodiment.

(Primary Advantages of the Invention)

According to the embodiments described in the above, the following primary advantages are obtained.

In the embodiments described in the above, the determination of whether the presence of a constituent such as fog that affects a view of space is performed based on the masked reference image in which the picture of the high-luminance obstacle has been masked. This leads to the reduction of error in the determination, the error being caused by the clearer picture of the high-luminance obstacle even in fog. Therefore, it is possible to accurately determines whether the presence of fog in the environmental atmosphere around the vehicle.

Further, in the masking operation, the high-luminance obstacle includes a lighting object that emits the light, for example, the tail lamp of the preceding vehicle, the rear fog lamp of the preceding vehicle, the light stood beside the road, and the like. The pictures of these lighting objects that emit the light has sometimes clearer edges in an image captured by the camera even if the image is captured in fog. The determination of whether the presence of a constituent such as fog that affects a view of space is performed base on the masked reference image in which the picture of the high-luminance obstacle has been masked. Therefore, it is possible to accurately determines whether the presence of fog in the environmental atmosphere around the vehicle.

Further in the reference image extracting operation, the reference image which only include a portion of the image captured by the image capturing device such as vehicle-mounted camera, CCD camera and the like. This leads to reduce the amount of calculation to determine whether the presence of fog form the image. Further, the picture of the high-luminance obstacle is masked to produce the masked reference image. The final determination is performed based on the masked reference image. Therefore, it is possible to accurately determines whether the presence of fog in the environmental atmosphere around the vehicle with smaller amount of the calculation.

Further, the high-luminance obstacle is defined as an obstacle having either higher luminance than a predetermined luminance value in the image or higher luminance than that of the sky. In the latter case, more accurate determination can be performed than in the former case because there can not be any picture of an obstacle having the higher luminance than that of the sky without the obstacle having any lighting function. Therefore, it is possible to accurately determines whether the presence of fog in the environmental atmosphere around the vehicle.

Further the output of the illuminance sensor installed on the vehicle is utilized to estimate each individual luminance of the pixels constituting the image captured by the image capturing device. If the relationship between the output of the illuminance sensor and the actual luminance of the obstacle or the sky has been estimated in advance, it is possible to determine the area which includes the picture of the high-luminance obstacle in the image. Thus, even in the case where the density of the constituent such as fog is varied with in the small range in the space, it is possible to accurately determines whether the presence of fog in the environmental atmosphere around the vehicle because the output of the illuminance sensor and the density of the constituent such as fog are correlated.

Further, in the masking operation, the wider area in the image including not only the picture of the high-luminance obstacle but also an area where the light emitted from the high-luminance obstacle is influenced is masked. Hence, the effect of the high-luminance obstacle can be deleted. Therefore, it is possible to accurately determines whether fog is present.

Further, in the conventional apparatus that determines of whether or not fog is present, it is necessary to mask the pictures of obstacles generating noise in the reference image in the spatial frequency analysis or in the edge intensity analysis. This results in generating the discontinuous parts in the sweep-line in the masked reference image. If the degree of the discontinuity is increased, the accuracy of the spatial frequency analysis or the edge intensity analysis is reduced because information containing the masked reference image becomes to be insufficient. Hence error in the determination of whether or not fog is present may be increased. However, in the apparatus according to the present invention, the reliability in the spatial frequency analysis or in the edge intensity analysis is considered based on the information containing the masked reference image. Therefore, it is possible to reduce the error in the determination of whether or not fog is present.

In some embodiment according to the present invention, the apparatus includes the means for classifying a result of determination into three categories, that is, the constituents is existing, the constituent is not existing, and the determination whether the presence of the constituent is impossible, based on the reliability. Therefore, it is possible to accurately determines whether the presence of fog in the environmental atmosphere around the vehicle.

Further, in some embodiment according to the present invention, the reliability includes the first reliability of determining the presence of the constituent, the first reliability being calculated based on a shape of the contour of the obstacle in the reference image which relates to each individual number of unmasked continuous parts of the corresponding array of the pixels, the arrays of the pixels constituting the masked reference image. In the determination of whether or not fog is present, the first reliability is considered. Therefore, it is possible to accurately determines whether the presence of fog in the environmental atmosphere around the vehicle.

Further, in some embodiment according to the present invention, the reliability includes the second reliability of determining the presence of the constituent based on an area surrounded by the contour of the obstacle which relates to a fraction of an area of unmasked regions to an area of masked region in the reference image. In the determination of whether or not fog is present, the second reliability is considered. Therefore, it is possible to accurately determines whether the presence of fog in the environmental atmosphere around the vehicle.

Further, in some embodiment according to the present invention, it is preferable that in determination of whether or not fog is present, the first and second reliabilities can be considered in order to reduce the error in the determination of whether or not fog is present.

Although the invention has been described above by reference to several embodiments of the invention, the invention is not limited to the embodiments described above. Modifications and variations of the embodiments described above will occur.

For example, the fast Fourier analysis is utilized as the spatial frequency analysis technique in the first embodiment. However, a wavelet analysis also be applicable.

Further, one of the input signals on which the spatial frequency analysis is applied is constituted by values of luminance of pixels that form a sweep-line or scanning-line in the horizontal direction. It is allowed that the sweep-line or scanning-line has the vertical direction in the image. Further it is allowed that the input signal contains information about values of luminance of pixels which forms an arbitrary portion of the image, such as a square portion having 16×16 pixels.

Further in the embodiments described above, the total reliability is calculated based on the first reliability and the second reliability. However, it is allowed that only one of the first and second reliabilities is used in the determining, operation in step S500 in FIG. 4.

Further in the embodiments described above, the total degree of discontinuity is defined as a fraction of sweep-lines whose degree of discontinuity is larger than a predetermined value. However, it is allowable that the total degree of discontinuity is defined as a number of the sweep-lines having the degree of discontinuity larger than a predetermined value.

Further in the embodiments described above, the fraction of the area of the removing region to the total area of the masked reference image is calculated as the index of masking fraction of the masked reference image. However, it is allowable that a fraction of the area of the remaining region which is not masked in the masking operation to the total area of the masked reference image is calculated as the index of masking fraction of the masked reference image. Further, the index of masking fraction of the masked reference image is calculated based on amounts of information about the masked area and the unmasked area in the masked reference image.

Further, the reference image extracting operation performed in step S100 on FIG. 1 can be omitted to perform. In this case, the reference image is equal to the image captured by the vehicle-mounted camera.

Further in the third embodiment described above, in order to mask the picture of the high-luminance obstacle, the actual luminance of sky at the location the predetermined forward the vehicle is determined in step S230 in FIG. 29, the values of the actual luminance (cd/m$^2$) of each of pixels constituting the region of sly within the image is calculated based on values of luminance of each of pixels of the reference image with referring to the correlations between the values of luminance of the pixels of the images captured by the vehicle-mounted camera 12 and the actual luminance of sky in step S240. However, it is allowable to perform the following steps in order to mask the picture of the high-luminance obstacle: detecting a value of illumination of the vehicle, estimating the values of luminance performs to estimate an actual luminance of the space ahead of the vehicle based on the values of luminance of the arrays of the pixels in the reference image captured by the image capturing block with reference to the value of illumination of the vehicle, and detecting a high-luminance obstacle performs to detect the high-luminance obstacle which is located ahead of the vehicle and whose picture is included in the reference image to determine an area including the picture of the high-luminance object in the reference image.

What is claimed is:

1. An apparatus for determining whether or not an image of a space captured by a vehicle-mounted camera contains fog, the apparatus comprising:
    means for determining a reference image which is at least a part of the image of the space captured by the vehicle-mounted camera;
    means for estimating an actual luminance of the sky at a location where the vehicle is traveling on the basis of the captured image,
    estimating an actual luminance of a road scene which corresponds to each of a plurality of pixels which form the reference image on the basis of a corresponding relationship determined in advance between pixel values and the actual luminance of the sky,
    determining an area in the reference image, in which a high luminance object as a headlight of a preceding vehicle is present, on the basis of the comparison result of the estimated actual luminance of the sky and the luminance of each of the pixels, and
    masking an area in the reference image including the high luminance object in the reference image to generate a masked reference image; and
    means for performing one of a spatial frequency analysis and an edge intensity analysis of the masked reference image, and judging a presence of fog in the reference image on the basis of a strength of a high frequency component contained in the masked reference image when the spatial frequency analysis is executed, and a total amount of an edge strength contained in the masked reference image when the edge intensity analysis is executed wherein
    when the spatial frequency analysis is executed, fog is determined as being present in the reference image when the strength of the high frequency component contained in the masked reference image is less than a first predetermined reference value, and
    when the edge intensity analysis is executed, fog is determined as being present in the reference image when the total amount of the edge strength contained in the masked reference image is less than a second predetermined reference value.

2. The apparatus according to claim 1, wherein the masking means masks an enlarged area in the reference image, where the enlarged area is obtained by enlarging the high luminance area containing the headlight of the preceding vehicle with a predetermined relationship.

3. The apparatus according to claim 1, wherein the performing means uses as the reference image a part of the image captured by the vehicle-mounted camera.

4. The apparatus according to claim 1, wherein the area in the single reference image determined to have the high luminance object present is smaller than an area of the single reference image.

5. An apparatus for determining whether or not an image of a space captured by a vehicle-mounted camera contains fog, the apparatus comprising:

means for determining a reference image which is at least a part of the image of the space captured by the vehicle-mounted camera;
means for estimating an illumination of the vehicle on the basis of the reference image,
estimating an actual luminance of a road scene which corresponds to each of a plurality of pixels which form the reference image on the basis of a corresponding relationship determined in advance between pixel values and an actual luminance of the sky,
determining an area in the reference image, in which a high luminance object as a headlight of a preceding vehicle is present, on the basis of the comparison result of the estimated illumination of the vehicle and the luminance of each of the plurality of pixels, and
masking an area in the reference image including a lighting object as a high luminance object in the reference image to generate a masked reference image; and
means for performing one of a spatial frequency analysis and an edge intensity analysis of the masked reference image, and judging a presence of fog in the reference image on the basis of a strength of a high frequency component contained in the masked reference image when the spatial frequency analysis is executed, and a total amount of an edge strength contained in the masked reference image when the edge intensity analysis is executed wherein
when the spatial frequency analysis is executed, fog is determined as being present in the reference image when the strength of the high frequency component contained in the masked reference image is less than a first predetermined reference value, and
when the edge intensity analysis is executed, fog is determined as being present in the reference image when the total amount of the edge strength contained in the masked reference image is less than a second predetermined reference value.

6. The apparatus according to claim 5, wherein the masking means masks an enlarged area in the reference image, where the enlarged area is obtained by enlarging the high luminance area containing the headlight of the preceding vehicle with a predetermined relationship.

7. The apparatus according to claim 5, wherein the performing means uses as the reference image a part of the image captured by the vehicle-mounted camera.

8. The apparatus according to claim 5, wherein the area in the single reference image determined to have the high luminance object present is smaller than an area of the single reference image.

9. An apparatus for determining whether or not an image of a space captured by a vehicle-mounted camera contains fog, the apparatus comprising:
means for determining a reference image which is at least a part of an image of the space captured by the vehicle-mounted camera;
means for determining an area in the reference image, in which a high luminance object as a headlight of a preceding vehicle is present, on the basis of a comparison result between pixels corresponding to the sky in the reference image and a plurality of pixels forming the reference image, and masking an area in the reference image including the high luminance object in the reference image to generate a masked reference image; and
means for performing one of a spatial frequency analysis and an edge intensity analysis of the masked reference image, and judging a presence of fog in the reference image on the basis of a strength of a high frequency component contained in the masked reference image when the spatial frequency analysis is executed, and a total amount of an edge strength contained in the masked reference image when the edge intensity analysis is executed wherein
when the spatial frequency analysis is executed, fog is determined as being present in the reference image when the strength of the high frequency component contained in the masked reference image is less than a first predetermined reference value, and
when the edge intensity analysis is executed, fog is determined as being present in the reference image when the total amount of the edge strength contained in the masked reference image is less than a second predetermined reference value.

10. The apparatus according to claim 9, wherein the masking means masks an enlarged area in the reference image, where the enlarged area is obtained by enlarging the high luminance area containing the headlight of the preceding vehicle with a predetermined relationship.

11. The apparatus according to claim 9, wherein the performing means uses as the reference image a part of the image captured by the vehicle-mounted camera.

12. The apparatus according to claim 9, wherein the area in the single reference image determined to have the high luminance object present is smaller than an area of the single reference image.

* * * * *